United States Patent
Simpson et al.

(10) Patent No.: US 6,493,315 B1
(45) Date of Patent: *Dec. 10, 2002

(54) ATM SWITCH FOR ROUTING DIFFERENT CELL TYPES

(75) Inventors: Robert Simpson, Bristol (GB); Neil Richards, Somerset (GB); Peter Thompson, Newport (GB); Pascal Moniot, Bernin (FR); Marcello Coppola, Trapani (IT); Vincent Cottignies, Chatou (FR); Pierre Dumas, Sevres (FR); David Mouen Makoua, Nanterre (FR)

(73) Assignees: SGS-Thomson Microelectronics Limited, Almondsbury Bristol (GB); Thomson-CSF, Paris (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/924,060

(22) Filed: Aug. 28, 1997

(30) Foreign Application Priority Data

Aug. 30, 1996 (GB) .............................................. 9618158

(51) Int. Cl.[7] .............................................. H04L 12/56
(52) U.S. Cl. ..................... 370/229; 370/235; 370/395; 370/412
(58) Field of Search ................................ 370/229, 230, 370/231, 232, 235, 236, 412, 428, 429, 395, 233, 234, 237, 253

(56) References Cited

U.S. PATENT DOCUMENTS

| | | | | | |
|---|---|---|---|---|---|
| 5,379,297 A | * | 1/1995 | Glover et al. | ............... | 370/234 |
| 5,438,567 A | * | 8/1995 | Ikeda | ......................... | 370/417 |
| 5,706,279 A | * | 1/1998 | Teraslinna | ................... | 370/397 |
| 5,768,789 A | * | 6/1998 | Van As et al. | .............. | 370/236 |
| 5,859,846 A | * | 1/1999 | Kim et al. | .................. | 370/389 |
| 6,229,789 B1 | * | 5/2001 | Simpson et al. | ............ | 370/235 |

FOREIGN PATENT DOCUMENTS

| | | | | | |
|---|---|---|---|---|---|
| EP | 681 385 A2 | 4/1995 | | ........... | H04L/12/56 |
| EP | 0 652 685 A2 | 5/1995 | | ........... | H04Q/11/04 |

OTHER PUBLICATIONS

Standard Search Report dated Nov. 29, 1996.

* cited by examiner

Primary Examiner—Hassan Kizou
Assistant Examiner—Saba Tsegaye
(74) Attorney, Agent, or Firm—Wolf, Greenfield & Sacks, P.C.; James H. Morris; Robert A. Skrivanek, Jr.

(57) ABSTRACT

An ATM routing switch has a buffer circuit for holding cells located on queues at output ports, the buffer having a first reserve buffer capacity for cells of a first type requiring integrity of cell transmission and a first designation for use in determining a permitted path through the network, a second reserve buffer capacity for cells of the first type having a second designation for use in determining a different permitted path in the network and a third reserve buffer capacity for cells of a second type accepting some loss of cells in transmission, flow control circuitry operating to limit input of cells of either the first or second type if predetermined thresholds for the first, second or third buffer capacities are reached.

23 Claims, 20 Drawing Sheets

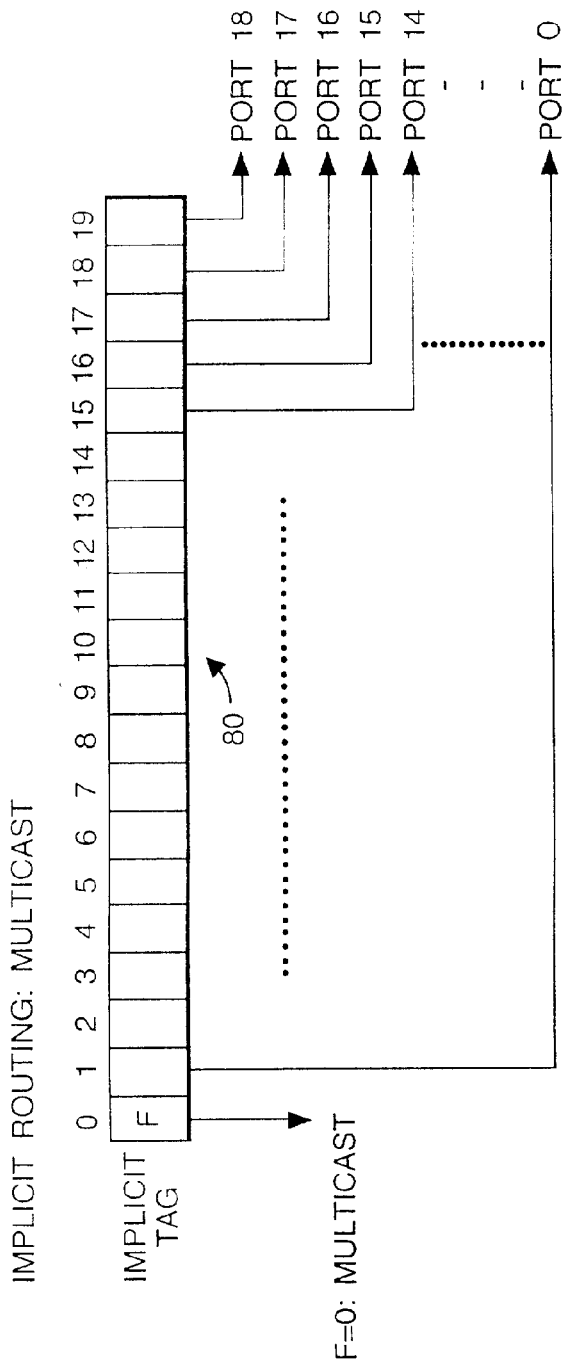
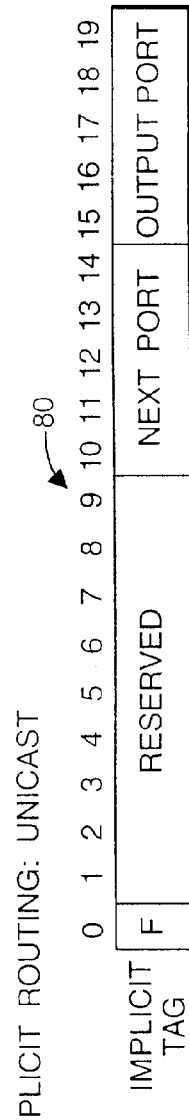
FIG. 8
FIG. 9

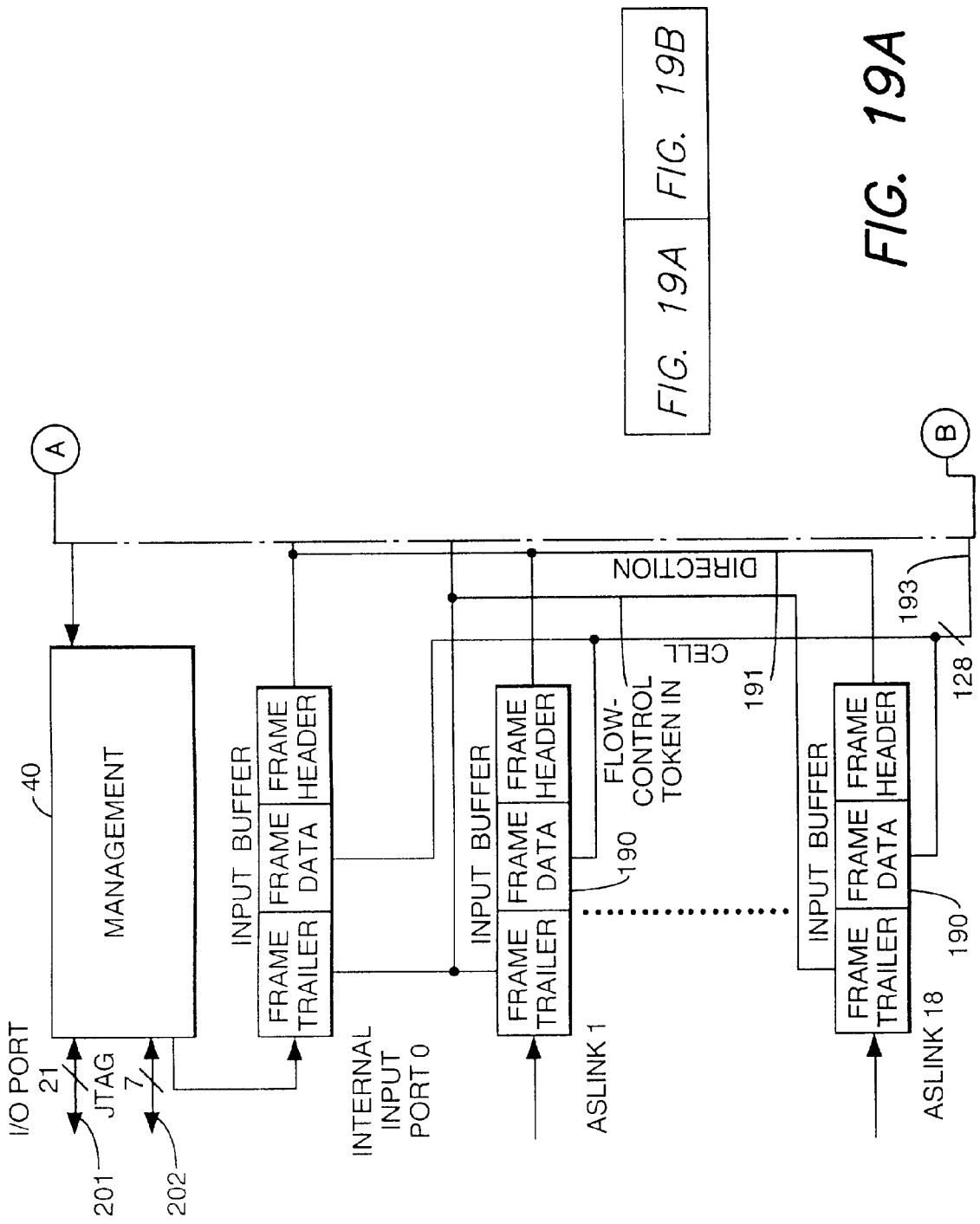

ATM SWITCH FOR ROUTING DIFFERENT CELL TYPES

The invention relates to routing switches for the transmission of digital signals and to methods of switching digital signals through routing switches. The invention is particularly applicable to ATM switches and methods of operating ATM switch networks.

BACKGROUND OF THE INVENTION

Data communications in digital form are commonly used for distribution of data between computers and in telecommunications for the transmission of voice signals. Distributed computing systems have used Local Area Networks (LANs) but the requirement to provide wider networks has led to the need for reliable telecommunications networks which can support computer data as well as traditional voice traffic. Existing telephone networks have been designed to transmit voice traffic around the globe and such systems have been optimised for low band width with low latency between sender and receiver although the traffic is relatively insensitive to noise and data errors. Local area networks which have been used for computer communication have generally operated over relatively short distances but require high band width for computer data and in this case the data is not necessarily sensitive to latency but must avoid data errors or omissions. To mix the two communication requirements in a signal network, Broadband Integrated Services Digital Network systems have been proposed and in particular Asynchronous Transfer Mode (ATM) systems have been proposed using small self-routing packets of digital signals.

It is an object of the present invention to provide improved routing switches together with improved methods of switching data packets through a network of routing switches and is particularly applicable to ATM switches and systems.

Reference in this specification to a switch for bi-directional transmission of digital signals means a switch such that when two are connected together each may output a digital signal to the other. Switch 1 may act as a source of digital signals sent to switch 2 acting as a destination while switch 2 may act as a source of digital signals sent to switch 1 acting as a destination. The reference to source and destination may each be intermediate in an extended network of switches.

SUMMARY OF THE INVENTION

The invention provides a routing switch for bi-directional transmission of digital signal cells of at least two types, a first type requiring integrity of cell transmission while accepting variable bit rate of transmission, and a second type accepting some loss of cells in transmission, which switch has a plurality of input ports for receiving input cells for transmission through the switch, a plurality of output ports for outputting output cells buffer circuitry selectively connectable to both said input and output ports for holding a plurality of cells of each type after receipt by an input port and prior to output by an output port, designation circuitry to provide for each input port, and cells input through each port, a respective designation selected from at least first and second designations for use in determining permitted paths in a network, said buffer circuitry providing a first reserved buffer capacity for cells of said first type having said first designation, a second reserved buffer capacity for cells of said first type having said second designation, a third reserved buffer capacity for cells of said second type, and control circuitry for determining whether each input cell is of said first or second type and whether cells of the first type are of the first or second designation, loading each input cell of said first type into said buffer and providing a flow control signal to limit input cells of said first type of either of the first or second designations if predetermined thresholds for said first and second buffer capacities are reached for cells of the first type of the first and second designations respectively, and loading each input cell of said second type into said buffer if the number of cells of said second type in said buffer has not reached a predetermined threshold for said third buffer capacity, or discarding input cells of said second type if said predetermined threshold for said third buffer capacity has been reached.

Preferably said control circuitry includes threshold store circuitry to indicate first, second and third threshold values for respective numbers of cells of said first and second types in said buffer circuitry, and counting circuitry to count the number of cells of each of said type held in said buffer circuitry, whereby said control circuitry operates to provide flow control signals when a count of cells of said first type of either designtion reaches the respective first or second threshold value and to discard cells of said second type when a count of cells of said second type reaches said predetermined threshold dependant on said third threshold value.

Preferably said buffer circuitry is partitioned to hold controlled numbers of cells for a plurality of categories of each of said first and second types, and said threshold store circuitry and counting circuitry each provide respective values for each of said categories.

Preferably said categories relate to respective different priorities for each of said first type of cell of the first designation, first type of cell of the second designation and second type of cell, and said threshold store circuitry and counting circuitry each provide respective values for each of said different priorities.

Preferably the control circuitry includes a store to indicate for each input cell whether the designation is the first or second designation.

Preferably said buffer circuitry is partitioned to provide limited overflow capacity in excess of said first and second threshold values for cells of said first type to accomodate further cells of said first type which are output from a source of cells of said first type prior to input of flow control signals by said source to indicate that said first or second threshold has been reached.

Preferably control bits are arranged to include a congestion indicator for each cell of said second type, said input circuitry being responsive to said congestion indicator to determine an offset value from a stored threshold for said second buffer capacity thereby indicating the said predetermined threshold at which a cell of said second type is discarded.

The invention includes a method of transmitting through a routing switch in a network, digital signal cells of at least two types, a first type requiring integrity of cell transmission while accepting variable bit rate of transmission, and a second type accepting some loss of cells in transmission, which method comprises receiving input cells at a plurality of input ports for transmission through the switch, outputting output cells from a plurality of output ports holding in buffer circuitry a plurality cells of each type after receipt by an input port and prior to output by an output port, designating each cell with a respective designation, selected from at least first and second designations, for use in determining permitted communication paths in the network, providing in said buffer circuitry a first reserved buffer capacity for cells of said first type having said first designation, a second reserved buffer capacity for cells of said first type having said second designation, and a third reserved buffer capacity for cells of said second type, determining whether each input cell is a first type in the first designation, a first type in the second designation, or second type, loading each input cell of said first type into said buffer and providing a flow control signal to limit input of cells of said first type of either the first or second designation if a respective threshold for said first or second buffer capacity is reached, and loading each input cell of said second type into said buffer if the number of cells of said second type in said buffer has not reached a predetermined threshold for said second buffer capacity, or discarding input cells of said second type if said predetermined threshold for said second buffer capacity has been reached.

Preferably the method includes providing first, second and third threshold values for respective numbers of cells of said first type of the first designation, first type of the second designation and second type, in said buffer circuitry, counting the number of cells of respective type and designation held in said buffer, providing flow control signals when a count of cells of said first type of either designation reaches said first or second threshold value and discarding cells of said second type when a count of cells of said second type reaches said third threshold value.

Preferably each of said first, second and third reserved buffer capacities are sub-divided to provide categories of different priority, a plurality of separate threshold values being provided for counts of each category.

Preferably cells held in said buffer form a plurality of queues at respective output ports, separate counts of queue length being maintained in addition to counts of numbers of cells held in the buffer, the generation of flow control signals and discarding of cells being responsive to both types of count.

BRIEF DESCRIPTION OF THE DRAWINGS

FIG. 8 shows a further operation of the part of the frame shown in FIG. 7, FIG. 9 shows an alternative operation of the part of the frame shown in FIG. 7.

DESCRIPTION OF THE PREFERRED EMBODIMENTS

The embodiment described relates to a communication network including a plurality of routing switches which may be applied to ATM and LAN interconnection and backbones as well as Broadband Network Access systems (including ATM PABX and switched digital disbritution systems) PC/workstation terminal adaptor cards and Residential digital video. The system is arranged to transmit self routing packets of digital signals through a plurality of routing switches in a network. Each packet comprises a data cell in a multi byte frame including control bits which are used in determining the route of the packet through each switch as well as the characteristics required in handling transmission of that packet. The packets may be of varying types depending on the priority required for various transmission characteristics for the packet. For some communications such as voice traffic, the priority may be for constant bit rate (CBR). Another type of traffic may tolerate variable bit rate (VBR). For computer communications the latency or time variation between successive packets may not be important but avoidance of errors or loss of data may have highest priority. For such communication an unknown bit rate (UBR) or best available bit rate (ABR) may be an acceptable or preferred characteristic for the data transmission.

The embodiment described is arranged to handle any of the above types of communication and each packet contains control bits to determine the manner in which the transmission of the packet will be handled through each routing switch. The routing switches may be used as elements of an ATM switch.

Each routing switch has a plurality of bi-directional ports for input and output of packets together with an on chip buffer for storing packets while forming queues of packets awaiting output at one or more of the ports. Packets may be allocated one of a plurality of traffic priorities and the system permits any one packet to be put on a queue for a single output port (unicast) or to be put on queues of more than one output port (multicast). Management of the routing switch chip can be controlled by an external CPU chip connected to a management port of the routing switch. This may control the allocation of buffer space on the routing switch chip to partition the buffer capacity for different types of traffic. Thresholds for cell delay variation and priority for cell disgarding in the event of congestion, can be programmed on the chip by use of external CPU control.

Figure 1:
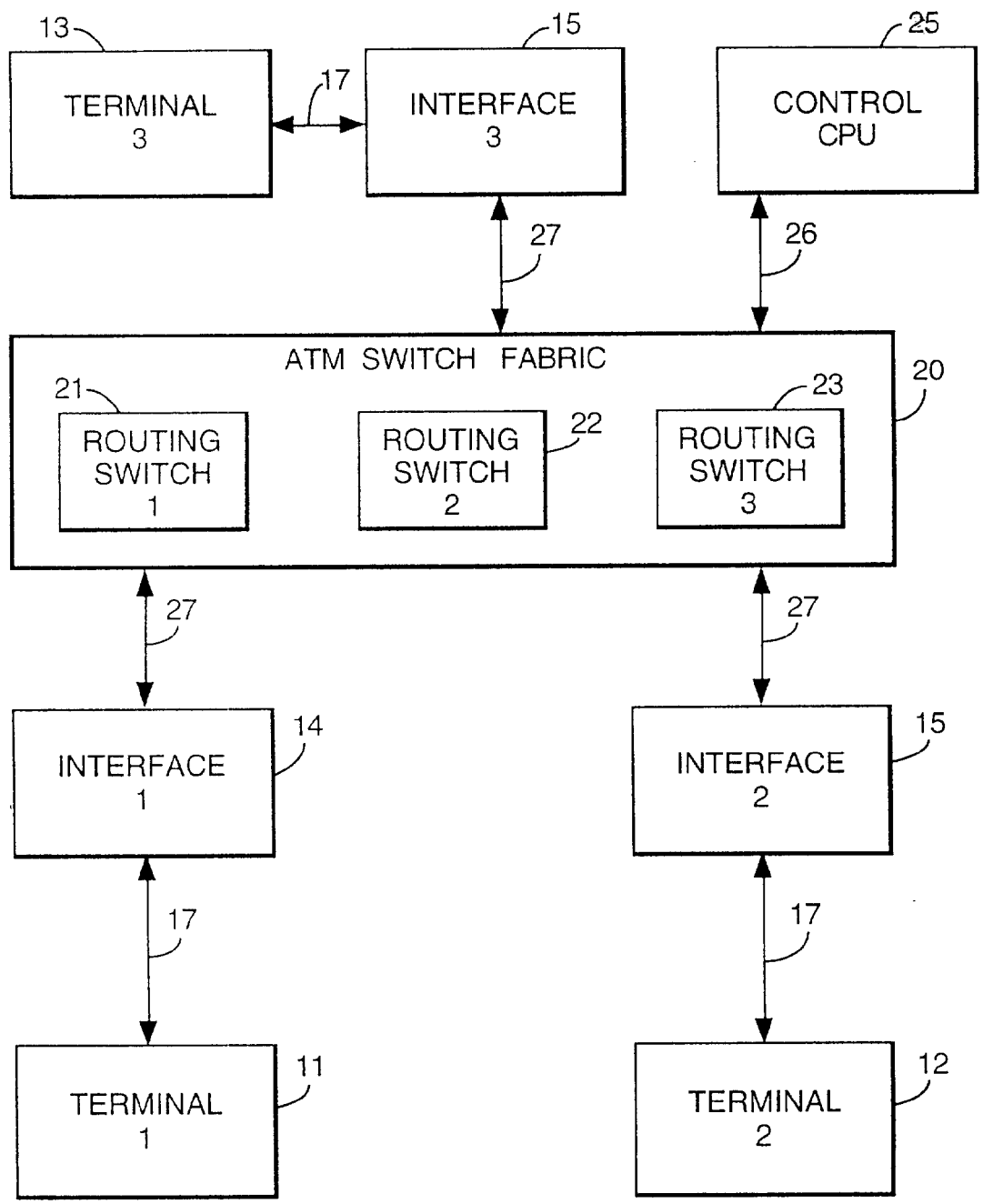
FIG. 1 is a block diagram of an ATM switch system in accordance with the invention.

A schematic network of routing switches in accordance with the present invention is shown in FIG. 1. This example shows three ATM terminals 11, 12 and 13 which may be arranged to input or output voice signals, video signals or computer data in digital form, or any mixture of them. Each terminal is connected to a respective interface 14, 15 and 16 by bi-directional links 17. Each interface is connected to the ATM switch fabric 20 which in this case comprises three interconnected routing switches 21, 22 and 23. Each routing switch is connected to other switches in the fabric by a plurality of bi-directional serial links each comprising four wires. Two wires in each direction carry respectively data and strobe signals. Programming of the routing switches in the switch fabric is controlled by a control CPU 25 which is connected to each of the switches by bi-directional links 26. Each interface 14, 15 and 16 is connected to a respective one of the switches 21, 22, 23 in the switch fabric by a bi-directional serial link 27.

Figure 2:
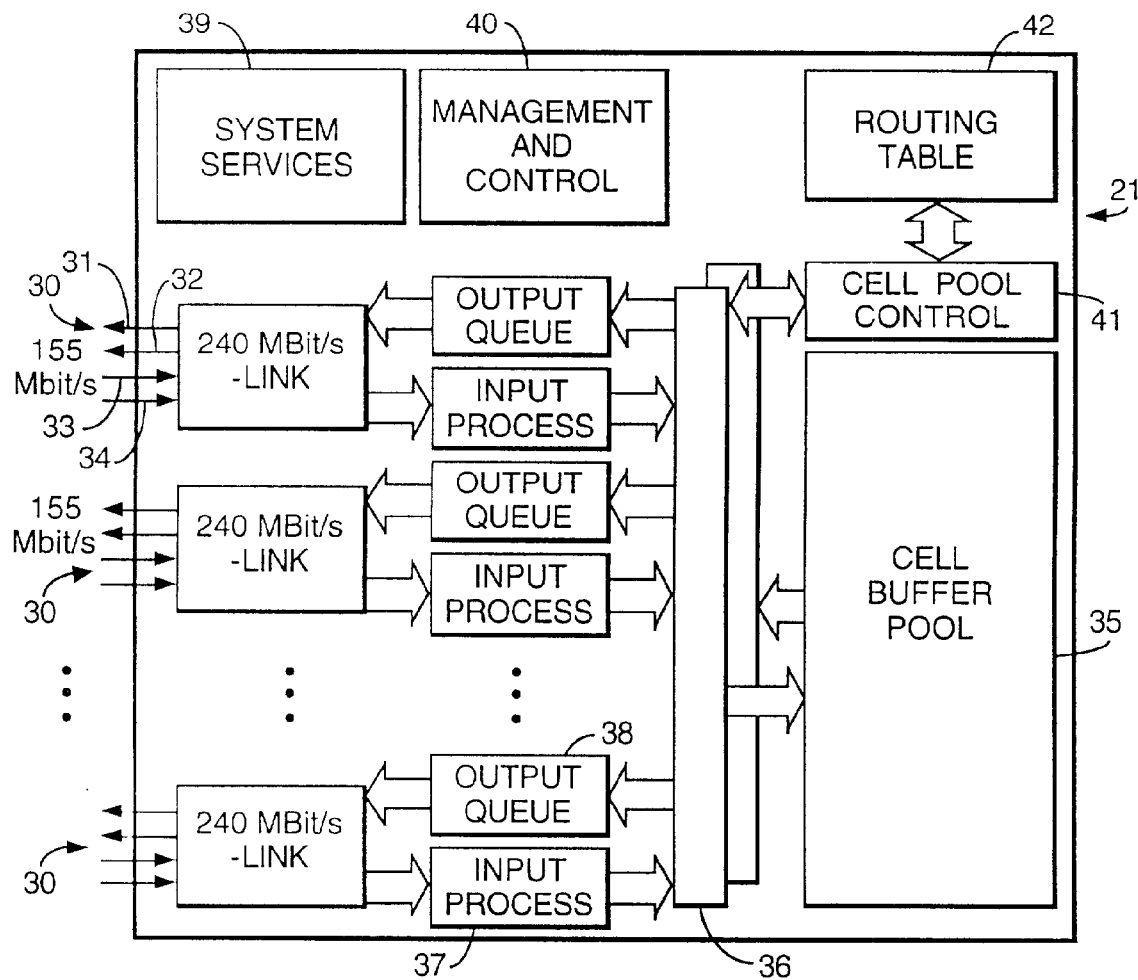
FIG. 2 is a block diagram of one routing switch for use in the system of FIG. 1.

FIG. 2 shows a simplified block diagram of one routing switch 21. This comprises a single chip device having a plurality of ports 30 each providing an output/input link. Each link has two output wires 31 and 32 providing serial data paths for data and strobe signals respectively. Each link also has two input wires 33 and 34 each providing serial data paths for data and strobe signals which are input to the switch. Data packets which are received by the switch are stored in a memory providing a cell buffer pool 35 connected by on chip buses 36 to the ports 30. Each port 30 is connected by a bus to input process circuitry 37 to handle incoming packets. Circuitry 38 is provided for each port to identify queues of processes stored in the buffer 35 awaiting output by the associated port 30. The chip also includes system service circuitry 39, management and control circuitry 40 as well as cell pool control circuitry 41. A routing table 42 is provided in memory on the chip for use in determining the route of selected packets transmitted through the chip.

It will be understood that the routing switches in any ATM switch fabric can be connected in any desired configuration. In the present example the maximum number of switches which may be connected in sequence between two interfaces is three. In other embodiments other numbers of switches may be connected between any two interfaces.

Figure 3:
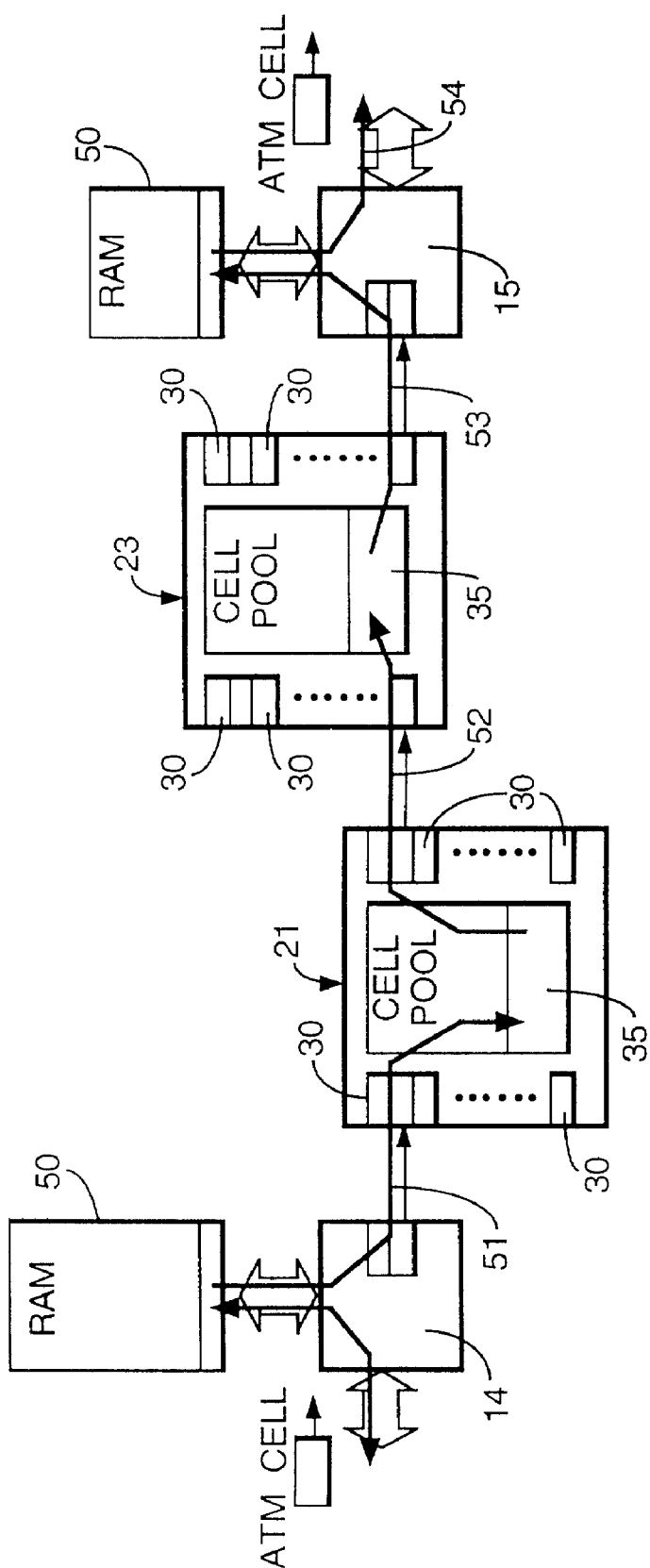
FIG. 3 shows schematically a communication path through two routing switches of the apparatus of FIG. 1.

In FIG. 3, one possible connection of switches 21 and 23 is shown between the interfaces 14 and 15. In this case, each of the interfaces 14 and 15 may be as described in French Patent Application No. 9604315.

Each interface has a substantial RAM 50 connected to the interface so that data packets may be stored at the interface if a further routing switch or terminal is not ready to receive the data packet from the interface. In the connection shown in FIG. 3, ATM cells are supplied to interface 14 and temporarily stored in the RAM 50 connected to the interface 14. Cells which are output from RAM 50 are fed along the data path 51 which is connected to a selected input port of switch 21. The cells are held in the pool 35 of switch 21 and then output on data path 52 from a selected output port of switch 21 to a selected input port of switch 23. The cell is then stored in the buffer 35 of switch 23 until output from a queue of a selected output port of switch 23 along data path 53 to the interface 15. The cell then is stored in RAM 50 connected to interface 15 until a further ATM switch network or a terminal receives the cell from interface 15 on datapath 54.

Figure 4:
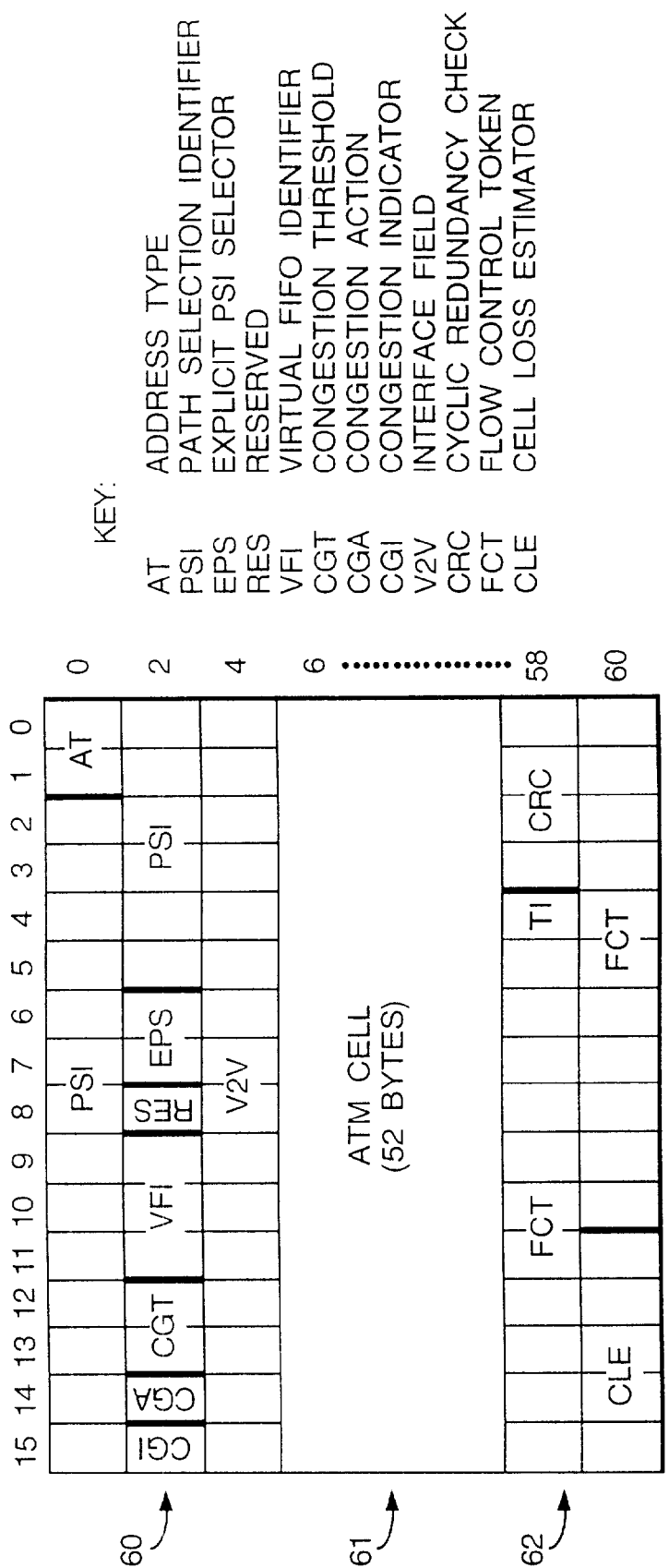
FIG. 4 shows the format of one cell frame used in the system of FIG. 1.

The bit format of each packet is shown in FIG. 4. The packet consists of a frame 62 bytes long. The frame consists of a header which is 6 bytes long followed by an ATM cell 52 bytes long giving the data which represents the communication to be made by transmission of the packet. The frame includes a trailer which is 4 bytes long.

In FIG. 4 the header is marked 60, the data cell is marked 61 and the trailer is marked 62. Most of the header remains unchanged throughout the transmission of the packet through a succession of routing switches. The header is applied to the packet by the interface, such as interface 14, at the input side of the switch network. The header generally determines the selection of ports which will be used on transmission of the packet through the switch network as well as the handling characteristics to be applied to the packet during that transmission. The trailer 62 is however applied at the output port of each routing switch to indicate to the next routing switch in the transmission path, any congestion at the routing switch which has just provided the source of that packet. Consequently the trailer will be changed on output of the packet by each successive routing switch in order to indicate the state of the outputting routing switch.

The fields of the header 60 are as follows. The first two bits are marked AT and represent the address type. The next 20 bits are marked PSI representing the path selection identifier. If AT has the value 1 then PSI is used to give the explicit address of the output ports required for three successive routing switches. If AT has the value 0 then the value of PSI is used to provide an implicit address. That will be described in more detail below. Two bits are marked EPS and this value is used to interpret the PSI value in the case of explicit addressing. This will be described in more detail below. After a reserved bit, three bits are marked VFI. These act as a Virtual FIFO identifier and will be described later in the selection of output queues for each cell. To control the discard of CBR cells in the event of congestion, two bits are marked CGT to identify a congestion threshold, one bit is marked CGA to identify what action is to be taken when congestion occurs and a further bit marked CGI can be set during transmission of a cell to indicate that congestion has arisen. Sixteen bits marked V2V form an interface to interface field for use in cooperation between the inputting interface 14 and the outputting interface 15. The data of the communication itself forms the central cell 61. The trailer 62 has four bits marked CRC which are used for a cyclic redundancy check by the interfaces. A further five bits marked CLE are used as a cell loss estimator and again this information is used by the interfaces 14 and 15 to check on the total number of cells, sent and received by the interfaces as described in French Patent Application No 9604315. The remaining bits of the trailer are used for flow control purposes to control flow of ABR cells from one routing switch to another when congestion occurs. Twenty-two of those bits are marked FCT and form a flow control token. The remaining bit marked Ti is used to identify which of two priorities, the flow control bits refer to as will be described later.

Port Selection

Figure 5:
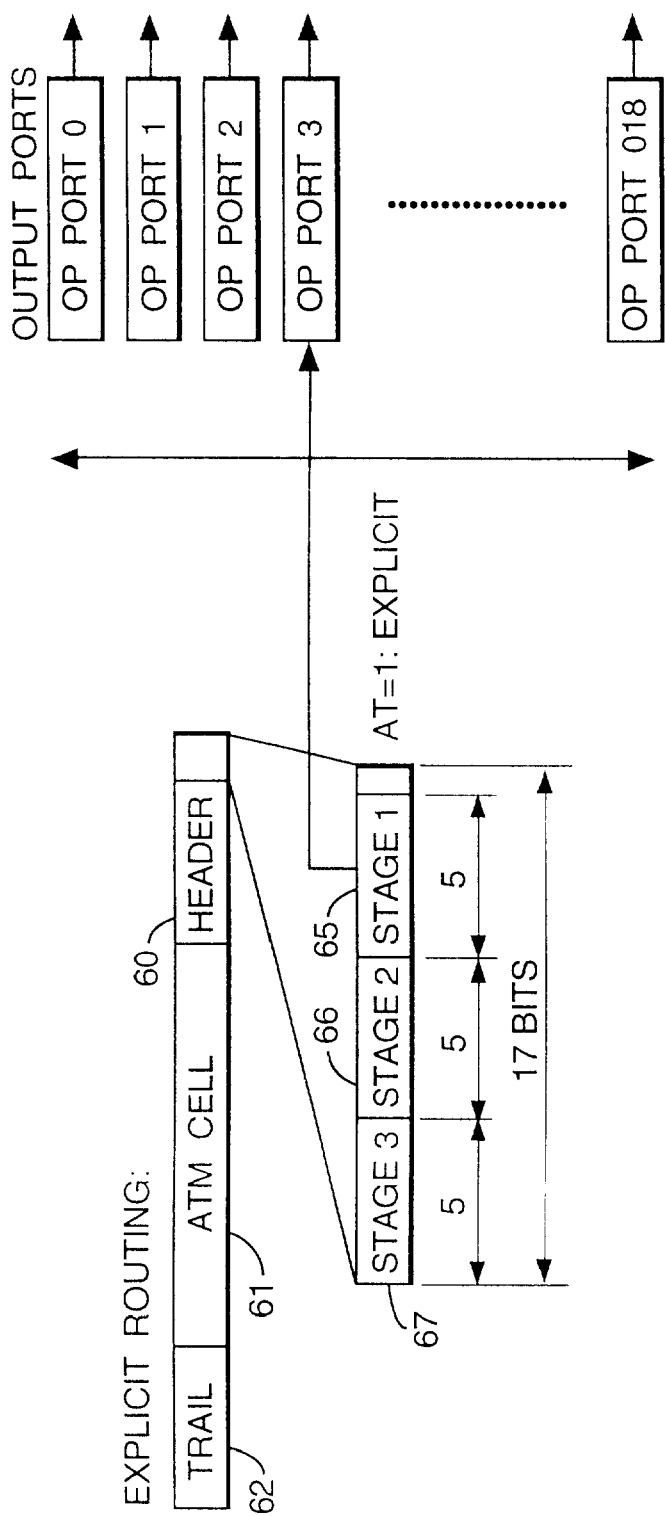
FIG. 5 illustrates the operation of part of the frame of FIG. 4.
Figure 6:
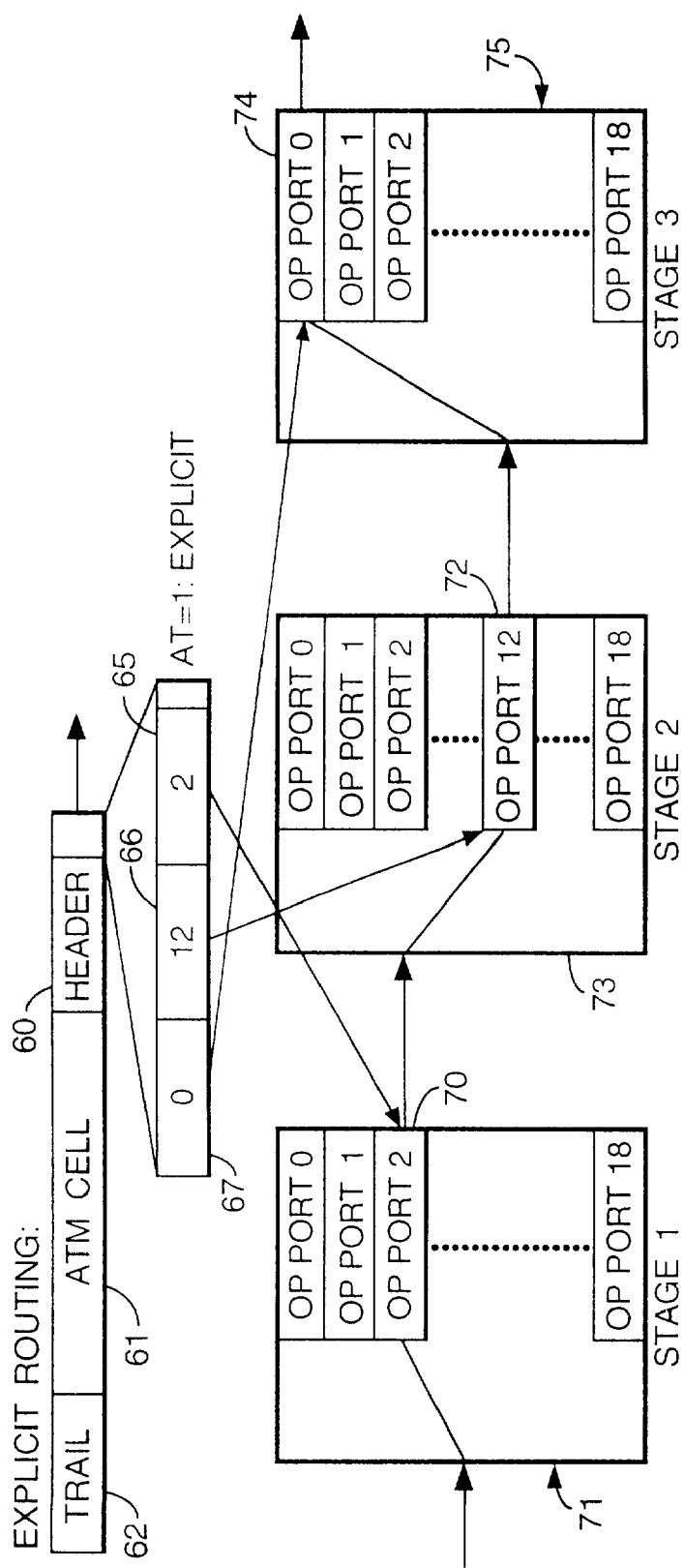
FIG. 6 shows in further detail the operation of the part of the frame shown in FIG. 5.

When a packet is input at a port of a routing switch either from an interface or from another routing switch, the input process circuitry 37 decodes data in the header 60 of the packet in order to determine whether the cell should be accepted or discarded. If accepted, the header information is used to determine which port or ports the cell should be output from, and which queue should be used at the selected output port or ports. As already explained, if the AT value is 1, then explicit addressing is used. In this case the PSI value forms four output port numbers each identified by five bits. The first three numbers are shown in FIG. 5 and each identifies a respective port number for three successive stages of routing switches. As illustrated in FIG. 5, the three successive stage indicators 65, 66 and 67 each identify a respective one of the eighteen possible output ports of successive routing switches. The determination of which of the three elements 65, 66 and 67 shown in FIG. 5 relates to which successive routing switch stage is determined by the EPS value. The EPS acts as a pointer for each routing switch to indicate which five bit element of the PSI value is to be used by that routing switch to identify the output port. At each switching step the EPS value is decreased by one so as to point to successive five bit elements of the PSI on moving from one switch to the next. As the input process circuitry 37 of each switch decodes the relevant element of the PSI to identify the output port required for that switch, it substitutes for that element of the PSI a value indicating the input port used to input that packet. This assists identification of the forward frame sender. The fourth element of the PSI which is not used by the three successive routing switches is used in routing the cell through the output interface. FIG. 6 shows the use of element 65 to select port 70 of a routing switch 71 whereas element 66 is used to select output port 72 of a second stage switch 73 and element 67 is used to select an output port 74 of a third stage switch 75.

In all the above examples of explicit addressing, the PSI value results in the cell being put on a queue at only one output port of each routing switch so that the cell is unicast.

Figure 7:
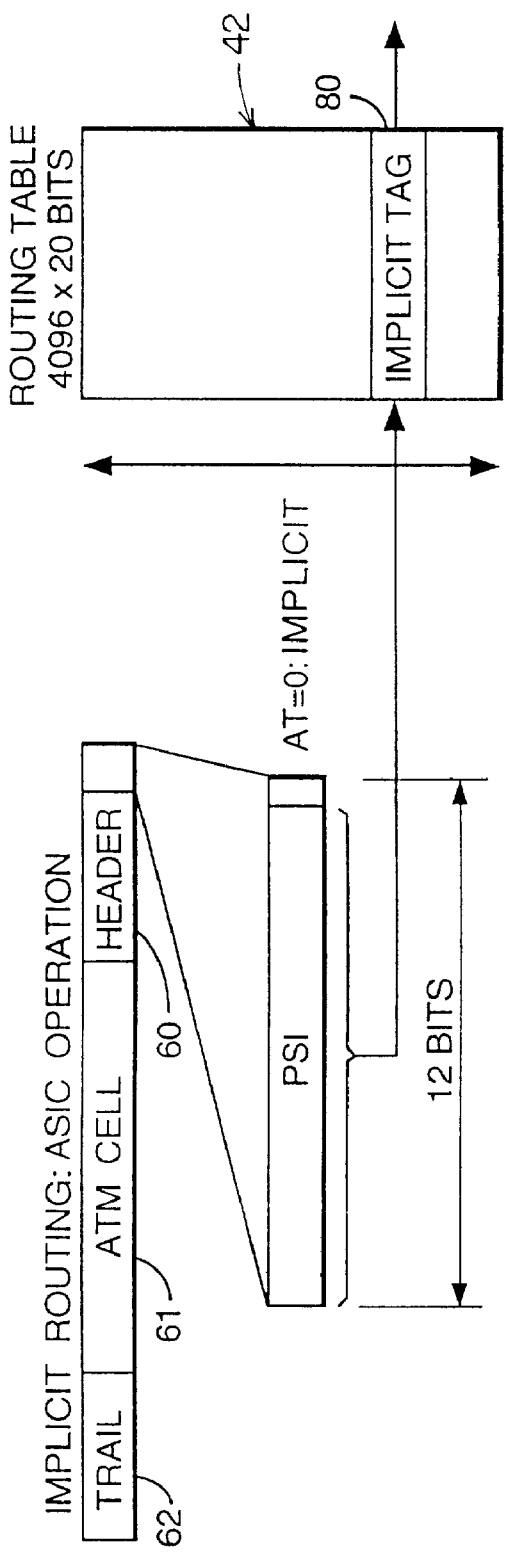
FIG. 7 shows an alternative operation of the part of the frame shown in FIG. 5.

In cases where AT has a value 0 implicit addressing is used. In this case only twelve bits of the PSI indicator are used and they address a location in the routing table 42 of the switch. The routing table 42 comprises a writable memory into which values have been loaded from the control CPU 25. The PSI value points to a selected address in the routing table as shown in FIG. 7 and an implicit tag 80 is read out from the table to the cell pool control circuitry 41. The format of this tag is shown more fully in FIG. 8. The tag comprises twenty bits. Bit 0 is marked F. If F has the value 0 then the cell is to be multicast and thereby put onto a queue at more than one output port. If F has the value 1 then the cell is unicast and the cell will be put on one or more queues but only at a single output port. The remaining nineteen bits identify respective output ports. Bit 1 identifies port 0 which is used only for management purposes. The remaining bits 2–19 identify respectively ports 1–18 which are used for the output of data packets. If the bit location of the tag has the value 1 then that output port is to be used. If the bit location has the value 0 then the corresponding port is not to be used. FIG. 9 shows the position where the implicit tag 80 has a value F=1 so that the cell is to be unicast. In this case bit locations 15–19 identify the output port to be used by the routing switch which has input this packet. Bit locations 10–14 identify the output port to be used by the next routing switch in the succession of routing switches used in the network. In this way, implicit tag identifies the output ports to be used by two successive routing switches.

Queue Selection

Figure 10:
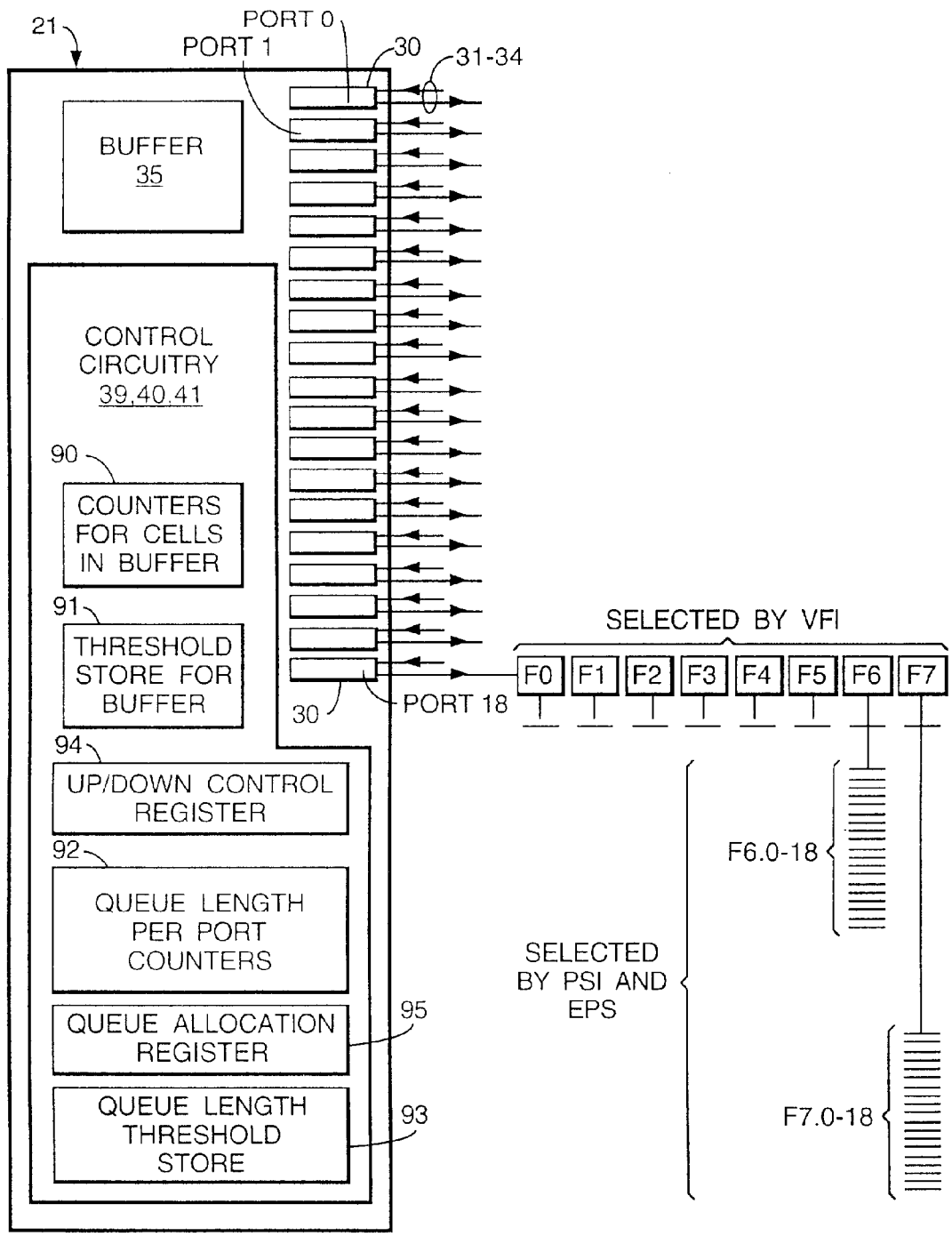
FIG. 10 illustrates a queue system for the routing switch of FIG. 2.

Having identified the required output port or ports for each cell which is input, it is necessary to decide which queue or queues the cell is to be put on at the selected output port or ports. As illustrated in FIG. 10, each routing switch, such as switch 21, has nineteen output ports 30. Port 0 is used for internal management purposes and ports 1–18 are used to communicate data for the message transmitted through the switch fabric. Each output port 30 can handle eight different priorities marked F0–F7. Each port may have a queue or queues for cells of each of these different designated priorities. Any cells with priority F0 will be treated with the highest priority so that they are output from the output port in preference to cells taken from queues of lower priority. For each of priorities F0–F5 only one queue is permitted per port. Each of those queues can handle either CBR cells or ABR cells. However each queue will consist only of cells of the same selected type. For priorities F6 and F7 each has one standard queue for CBR or ABR cells similar to F0–F5. Each of the queues for priorities F0 to F7, which may be used for ABR or CBR, is allocated to controlled traffic (e.g. ABR) which is controlled by flow control tokens, or to uncontrolled traffic (e.g. CBR) which is subject to discard rather than flow control. The allocation of each priority level to one or other of these types is controlled by the control CPU 25 storing required values in a queue allocation register 95 indicating which priority level is available to controlled or uncontrolled traffic. Register 95 also contains indicators to subdivide the uncontrolled traffic into more than one priority level. In this example, CBR traffic may have two different priority levels CBR0 and CBR1. Register 95 holds values to indicate which of priorities F0–F7 are allocated to CBR0 and which are allocated to CBR1. In this way, the priority indicator in the header of each frame, together with the data loaded into register 95, will indicate whether the traffic is controlled or uncontrolled and what its priority level is.

For priority F6, an additional nineteen queues F6.0–18 can be provided only for controlled ABR traffic. Each one of those queues corresponds to a designated output port for the next routing switch in the succession of routing switches. Similarly for priority F7, an additional nineteen queues F7.0–18 can be provided only for controlled ABR traffic, each queue corresponding to a designated output port of the next routing switch in the succession of switches. Queues F6.0 and F7.0 are used for packets carrying out internal management functions only and designated for port 0 of the next switch. Cells which are put on any one of the queues F6.0–18 or F7.0–18 can only be ABR cells which are unicast. The other queues may be unicast or multicast. It was seen in relation to FIG. 9 that ABR cells which were unicast obtained an indication from the implicit tag 80 (bit positions 10–14) of the selected port for the next routing switch in the succession of routing switches. Consequently, any routing switch handling an implicit tag of the type shown in FIG. 9 will know which output port to use for the present routing switch and which output port will be required for the next routing switch. Consequently, cells of that type can be put onto a selected queue for priority F6.0–18 or priority F7.0–18, the selected queue being designated specifically for a selected one of the output ports of the next switch in the sequence. This assists in avoiding head of line blocking. In other words, some cells of priority F6 or F7 may be destined to be transmitted through an output stage of a subsequent switch at which congestion is occurring. Any such cell at the head of a queue will prevent output of other cells which may be destined for subsequent output ports which are not blocked. Hence the queue will be blocked by the head of line entry. By providing a plurality of separate queues for each of priorities F6.0–18 and F7.0–18, each queue being dedicated to a specific different output port of the next routing switch, those queues which are destined for non-congested output ports downstream can be output without delay.

Figure 11:
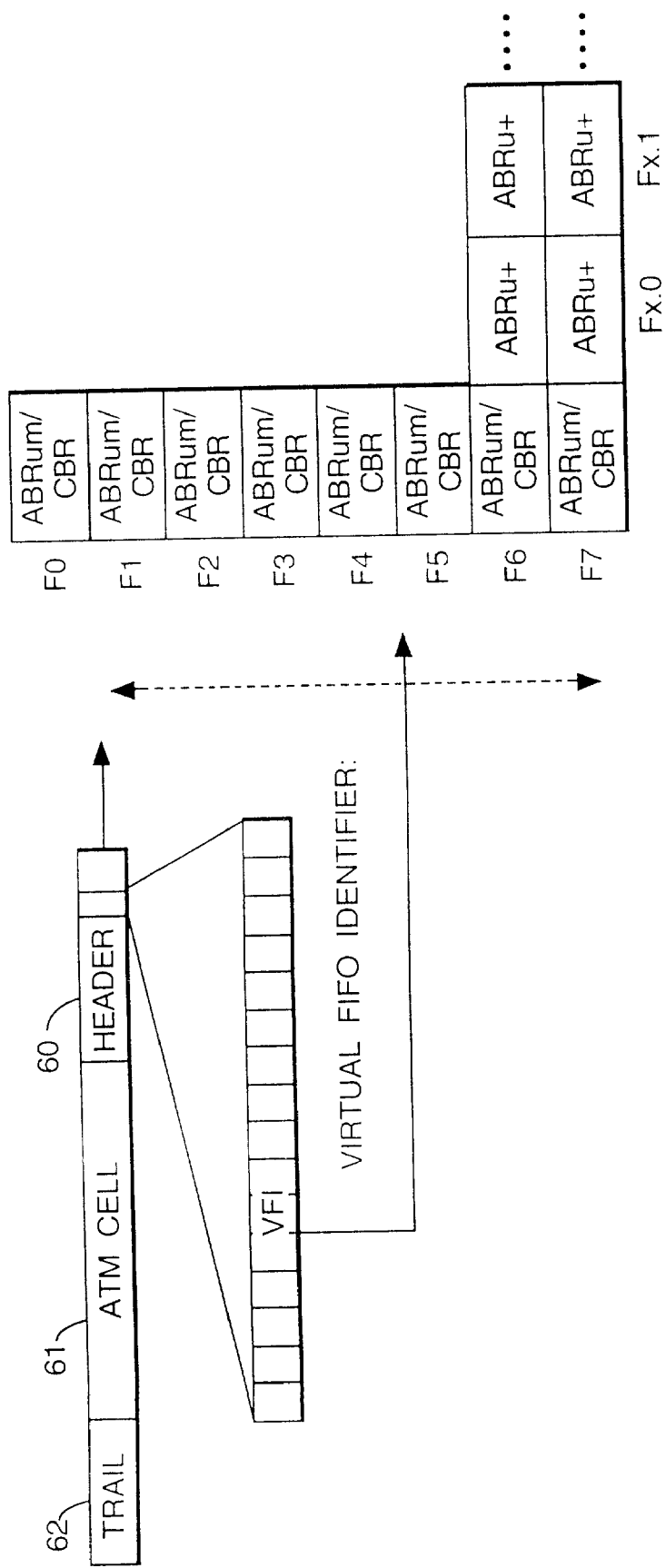
FIG. 11 shows the operation of a further part of the frame of FIG. 4 in forming the queues of FIG. 10.

The selection of queue is determined as shown in FIG. 11. The VFI indicator from the header 61 provides a numerical value corresponding to one of the priorities F0–F7. This in combination with the decoding of the PSI value allows correct selection of the required output port or ports and the correct one of the several possible queues F0–F7 at the selected output port or ports. If the decoding of the header indicates that the cell is a unicast ABR cell of priority 6 or 7 with identification of the next switch output port then it is added to the correct one of the possible nineteen queues for either priority F6.0–18 or priority F7.0–18 depending on the next switch output port identified from the implicit tag shown in FIG. 9.

It will therefore be seen that each output port has the possibility of forty six simultaneous queues. One queue for each of priorities F0–F5 and twenty queues for each of priorities F6 and F7.

FIG. 10 also indicates that the control circuitry 39, 40 and 41 includes a number of counters and threshold stores for use in flow control and congestion control. Counters 90 are provided for counting numbers of different types of cells in the buffer 35. A store 91 is provided for setting threshold values for various types of cells in the buffer 35. Counters 92 are provided for responding to the queue length per port. A store 93 is provided to set threshold values for the per port queue length indicated by the counters 92.

In addition, it is necessary for flow control to identify the direction in which cells are passing through any one switch in a sequence of switches. In this example, each switch is capable of handling cell transmission in two opposite directions along a linear chain shown in FIG. 3. One of these directions will be referred to as the up direction and the other as the down direction. The ports 30 are correspondingly identified either as an up direction port or a down direction port depending on the direction in which a cell is being transmitted through that port. This will be explained more fully in relation to the operation of the buffer 35. In order to identify the designation of each of the ports 30, an up/down control register 94 is provided to identify each port as an up direction port or a down direction port and each cell is buffered as an up cell or a down cell depending on the designation of port through which it was input.

Figure 12:
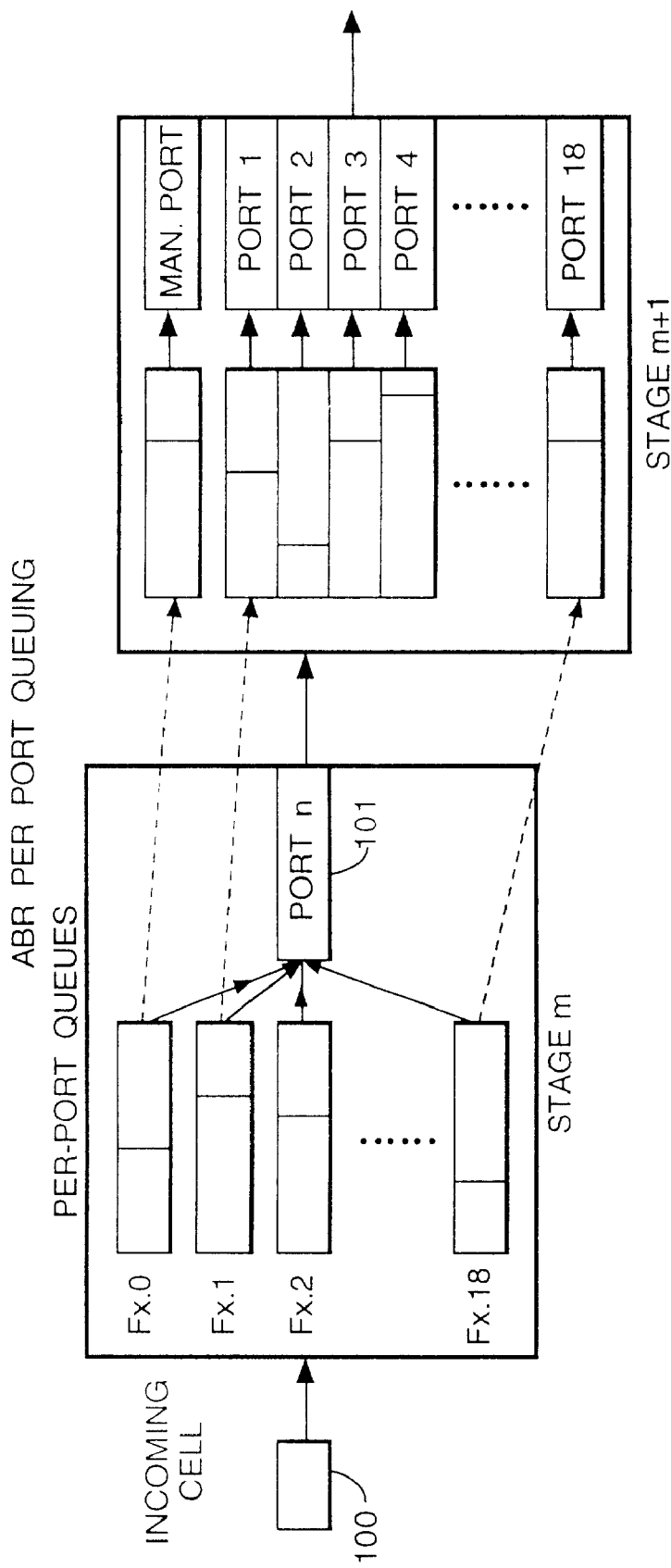
FIG. 12 shows further detail of the operation of the queues of FIG. 10.

The avoidance of head of line blocking is further illustrated in FIG. 12. In this case an incoming cell 100 having priority F6 or F7 is put onto the appropriate queue FX.0–FX.18 at port n marked 101. This is an output port of a switch at stage m in the network. The output port 101 is connected to an input port of switch at stage m+1. Nineteen different queues at port n are each directed at a respective different output port of the switch at stage m+1. If any one of the output ports of stage m+1 has a queue which reaches a threshold indicating congestion then a flow control mechanism using the previously described flow control tokens is operated to indicate to the switch at stage m that any of the queues FX.0–FX.18 which are destined for a congested port of stage m+1 should not be output until the congestion is cleared by receipt of a frame travelling from stage m+1 to stage m indicating clearance of the relevant port of stage m+1.

Mechanism for Identifying Queues

Figure 13:
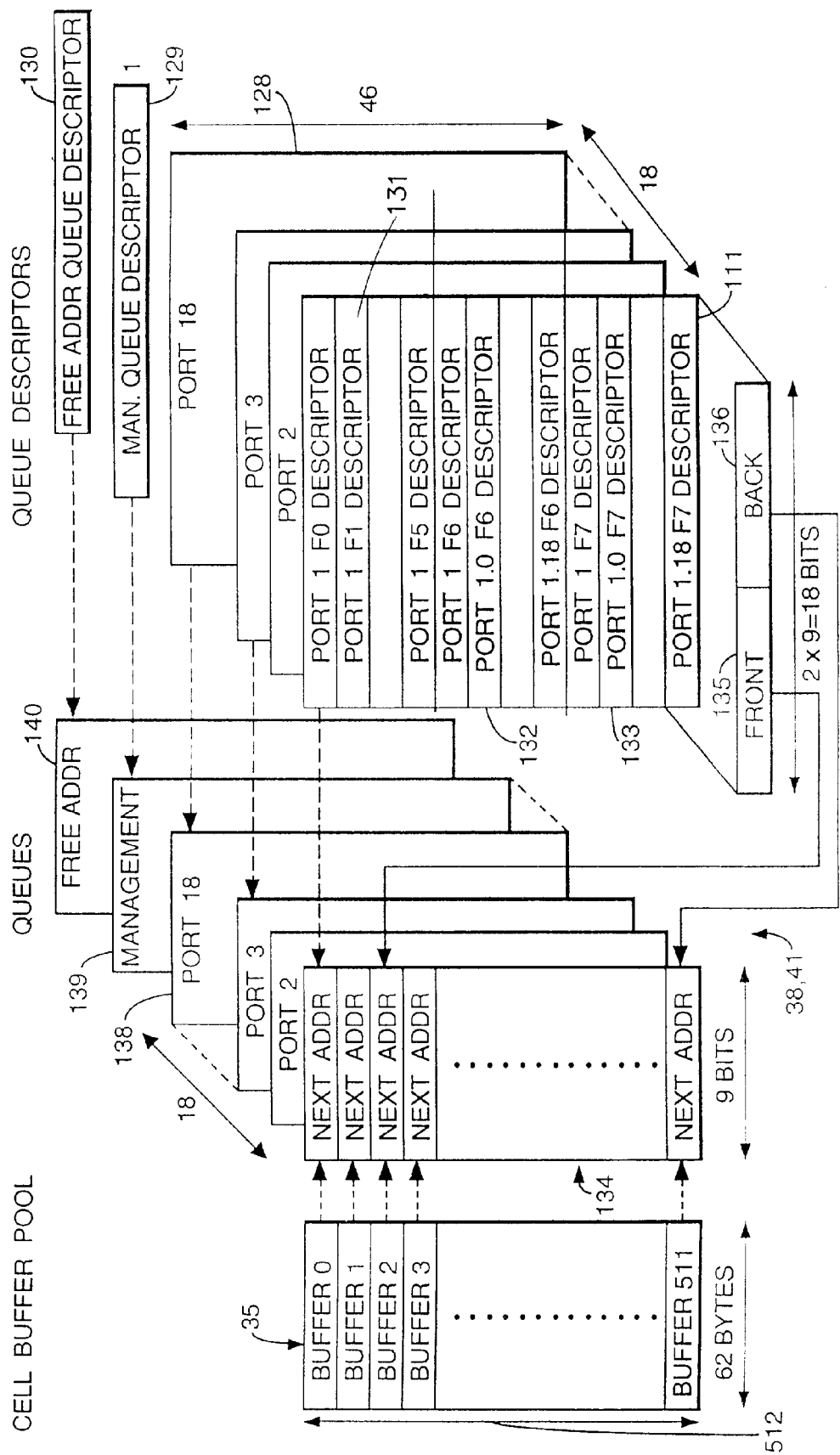
FIG. 13 illustrates the memory system used to identify the queues of FIG. 10.

The manner in which the cells in the buffer 35 are identified for each queue at an output port is illustrated in FIG. 13. The buffer 35 is 62 bytes wide so that it holds one frame per row. The buffer can hold 512 rows. Various rows will be holding a cell ready for output while other rows are empty awaiting input of a cell and these empty rows have free addresses indicated by a free address queue for use by the input control circuitry. The output control circuitry 38 and cell pool control circuitry 41 includes writeable memory as shown in FIG. 13. That includes a respective memory table for each port giving a queue descriptor for each queue at that port. These memory regions are marked 111 for port 1 to 128 for port 18. A separate management queue descriptor is provided in memory region 129 and a free address queue descriptor is provided in memory region 130. The list of queue descriptors is generally similar for each port and will be described with reference to the memory region 111 for port 1. This includes a list of descriptors. One descriptor 131 is provided for each single queue of priorities F0–F5. For priority F6 twenty descriptors 132 are provided for each of the twenty queues referred to in FIG. 10 for priority F6. Similarly twenty descriptors 133 are provided for each of the queues for priority F7. Each of the descriptors in memory region 111 comprise a front of queue pointer 135 and a back of queue pointer 136. A second writeable memory region 134–138 is provided for each port. Each memory region 134–138 has row locations corresponding to row locations of the buffer 35. In FIG. 13 memory region 134 relates to port 1 and similar memory regions are provided for each port up to memory region 138 provided for port 18. A management memory region 139 is identified by the management queue descriptor 129 and a free address memory region 140 is pointed to by the free address queue descriptor 130. The operation of each memory region 134–138 as well as 139 and 140, is generally similar and will be described with reference to region 134 relating to port 1. The front descriptor 135 indicates the row location of memory region 134 corresponding to the cell in buffer 35 which is at the head of the queue. That identifies the first cell to be taken by that queue when it is output. The region 134 which was pointed to by the front pointer 135 indicates the next buffer row to locate the second cell to be output in that queue. As each cell in the queue is located, the corresponding row of memory region 134 identifies the location of the next cell for that queue. This progresses until the last cell in the queue is located by the back pointer 136. Although the location of that cell can be identified in the buffer 35, the corresponding row of memory region 134 does not have an indication of a next address for a cell in that queue until a further cell is added to that queue. At that time the back pointer 136 will be adjusted. The queue handling for management cells which are transmitted through port 0 are handled in a similar way by the descriptor 129 and the memory list 139. Similarly the list of free addresses in the buffer 35 for use by incoming cells to the buffer 35 is handled by the descriptor 130 and list 140.

It will therefore be seen that the memory regions 134–138 form a plurality of linked lists each for a respective one of the output ports. Each location in the list provides a link to the next cell in the queue so that a thread of identification of successive cells in a queue is provided through the memory locations in each of the lists 134–138. The linking of each sequence through the memory regions 134–138 causes the memory regions to act as virtual FIF0's.

It will be understood that for each of priorities F0–F5, a single thread of cell identifiers forming a queue exists in each of the memory regions 134–138. However, for priorities F6 and F7, a plurality of threads exists through each of the memory regions 134–138. That plurality of threads for each memory region consists of a discrete thread for each of the queues F6.0–18 and F7.0–18 as well as for the standard F6 and F7 queue holding either ABR or CBR. In the case of the multiple threads existing for the queues F6.0–18 and F7.0–18, the cells identified on these lists are ABR unicast cells so that they are identified only on a single one of the memory regions 134–138 corresponding to the selected one output port through which the cell can be output. Furthermore, each cell on a list where multiple threads exist on the same memory region 134–138, will only occur on one thread on that memory region as it is unicast both for the present switch which is outputting the cell and also on the next switch in the sequence. Consequently no ambiguity arises in locating next addresses on the multiple threads which are held on the same memory region 134–138.

In the case of priority F0–F5 as well as the standard queues (holding CBR or ABR) for F6 and F7, these queues may incorporate multicast cells so that the same cell may be located on more than one queue and thereby more than one thread. However in this case any plurality of threads which identify the same cell will be located on different memory regions 134–138 corresponding to the relevant output port. Consequently the separate lists maintained on the separate memory regions 134–138 enable the correct next cell to be located for any queue regardless of which queue caused the removal of the cell from the buffer 35.

Buffer Partitioning

To handle effectively a variety of traffic requiring different handling characteristics such as CBR and ABR, it is important that the buffer space on the switch chip does not get used by only one class of traffic or by one particular port. Consequently it is necessary to monitor congestion within the buffer itself and congestion at any particular port to initiate either cell discard action for CBR cells or flow control for ABR cells once a switch becomes overloaded or approaches that condition for any particular type of cell. To optimise the share of buffer capacity between different types of traffic, a number of partitions are set up in the buffer 35 to limit the acceptable capacity of the number of cells stored of each of a number of designated types of packet. Firstly a partition 150 is set up to indicate the maximum of CBR cells that may be held in the buffer. Within that partition two separate partitions 151 and 152 are set up for respective different priorities of CBR cells designated CBR0 and CBR1. On input of a CBR cell the switch may designate different priorities dependant on the programming of the register 95 and the VFI indicator in the frame header so that a cell is held either as a high priority CBR0 cell or a lower CBR1 cell. A region within the partition 150 is marked 153 representing an overlap region which may be used by cells of either CBR0 or CBR1 designation. A further partition 160 within the buffer 35 is allocated to ABR cells. As already explained, cells may have been designated as up or down cells. In case of ABR cells, congestion will result in flow control tokens being included in a packet travelling in an up direction in order to control flow of packets back to the switch in the down direction. Similarly for packets flowing in the down direction flow control tokens are used to prevent packets flowing back to the same switch in the up direction. To avoid deadlock caused by flow control operating in opposition directions simultaneously on the same switch, it is necessary to check on congestion for ABR cells flowing in the up and down directions separately. For this reason the partition 160 has sub-partitions to handle separately buffer allocation for ABR signals in the up direction and the down direction. It is also advantageous monitor the congestion separately for ABR cells of priority 0–5 from those of priority 6–7. For this reason, partition 160 includes four separate partitions 161, 162, 163 and 164 which provide guaranteed buffer space up to their threshold values for ABR cells respectively of 0–5 up, 6–7 up, 0–5 down and 6–7 down. A further overlap region 165 is provided which may be used for cells of any of the types represented by partitions 161, 162, 163 and 164. There are also overlap regions for use by any of these ABR cells between the partitions 161, 162, 163 and 164. When the cells stored in any of the regions 161–165 reach the threshold values set for these partitions, flow control tokens are created to limit further input of cells of that type to the switch buffer. However there is inevitably a time delay in the restricted flow becoming operative as the flow control cannot be instantaneous. For this reason a margin partition 166 is provided to handle any incoming ABR cells which were en-route to the switch prior to other switches responding to the flow control tokens.

Figure 14:
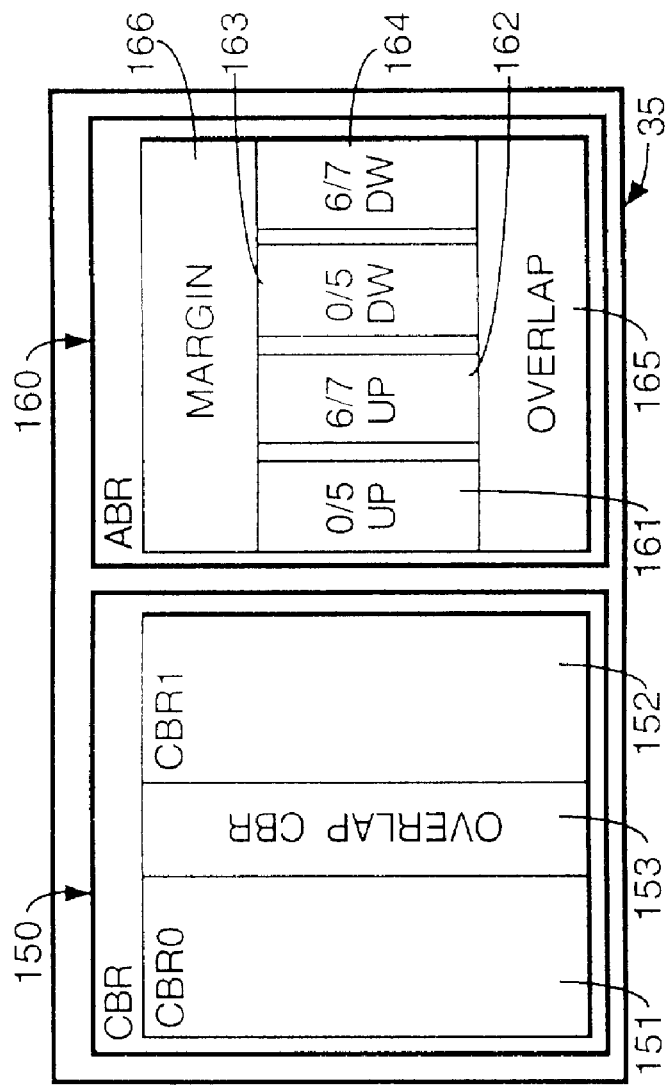
FIG. 14 shows memory partitioning for a memory used in FIG. 2.

The cell capacity for each of the partitions set up in the buffer of FIG. 14 is determined by a respective threshold store value held in store 91 shown in FIG. 10. These threshold values may be set by the control CPU 25. The content of the buffer 35 is monitored by counters 90 (FIG. 10) and compared with the threshold values stored in the store 91. In addition to monitoring the numbers of cells stored in the buffer 35 as a whole, counts are also carried out on a per port basis. Each port has three counters (92 in FIG. 10). One counter provides a count of the total number of CBR0 cells that form a queue at that port. A second counter gives a count of the total number of CBR1 cells that form a queue at that port. The third counter for each port counts the aggregate number of ABR cells of priority 6 and 7 that is awaiting output by that port. A threshold count for each of these three counters is also held in a store 93 shown in FIG. 10. Comparison of the counted values with the threshold values for either the total buffer values or the per port values may be used to cause the input or output circuitry of the switch to initiate discard action for incoming cells or output of flow control tokens to limit arrival of further cells. In the case of the counter 92 which counts the aggregate length of queues of ABR 6 and ABR 7 cells, this does not need to count the two different priority queues separately. Priority 6 is higher than priority 7. Consequently, the threshold value for the number of priority 7 cells is set lower than that for the permitted number of priority 6 cells. As soon as the aggregate reaches the threshold value for priority 7 cells, flow control tokens are output to inhibit further input of ABR priority 7 cells for that port so that more priority 6 cells can still be accepted until the count reaches that set for the aggregate of priority 6 and priority 7.

To avoid deadlock due to the flow control mechansim, the above example operates with controlled flow in the up and down directions. Cells which are stored in an up partition of the buffer can go to an up or a down partition of the buffer of an adjacent switch in the network. Any cells which are held in a down partition of a buffer can only go to a down partition of an adjacent switch. An input interface connected to a switch network must always supply the cell to an up region of the buffer of the first switch connected to the interface. The output interface at the end of the switch sequence can receive a cell from either a down or an up partition of the buffer of the last switch in the sequence.

Flow Control for ABR Cells

Figure 15:
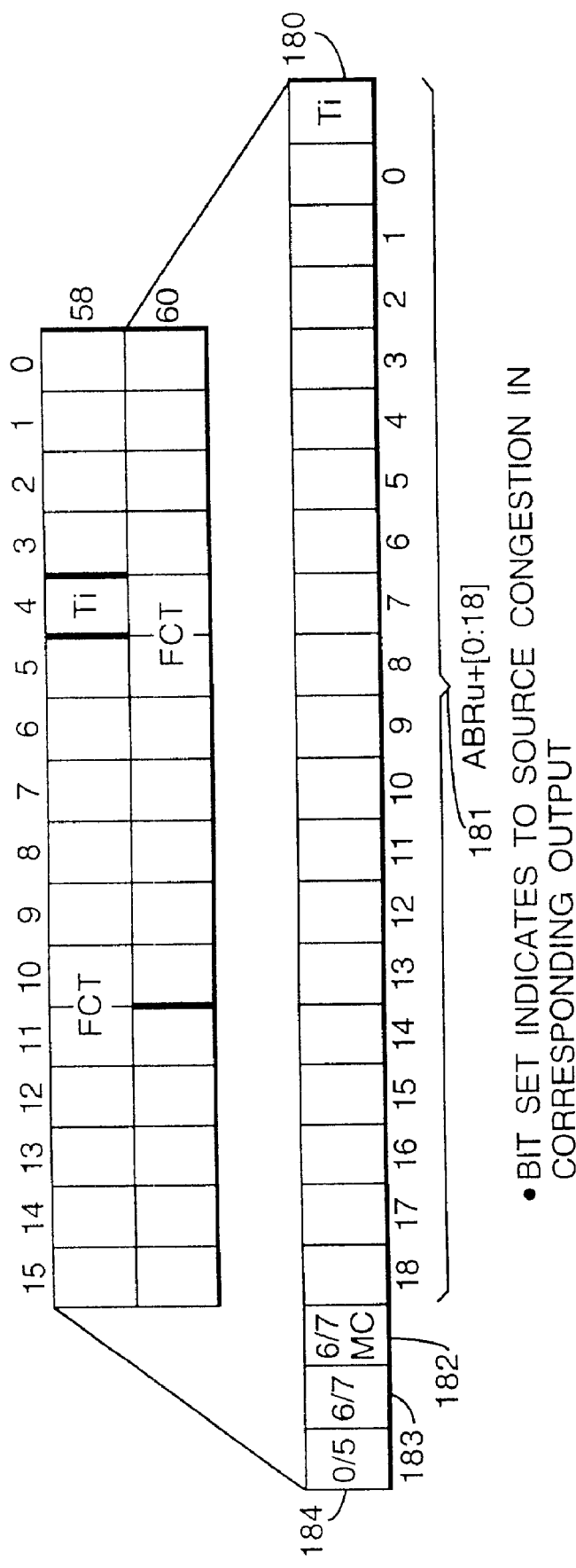
FIG. 15 illustrates part of the frame format of FIG. 4 used for flow control.
Figure 16:
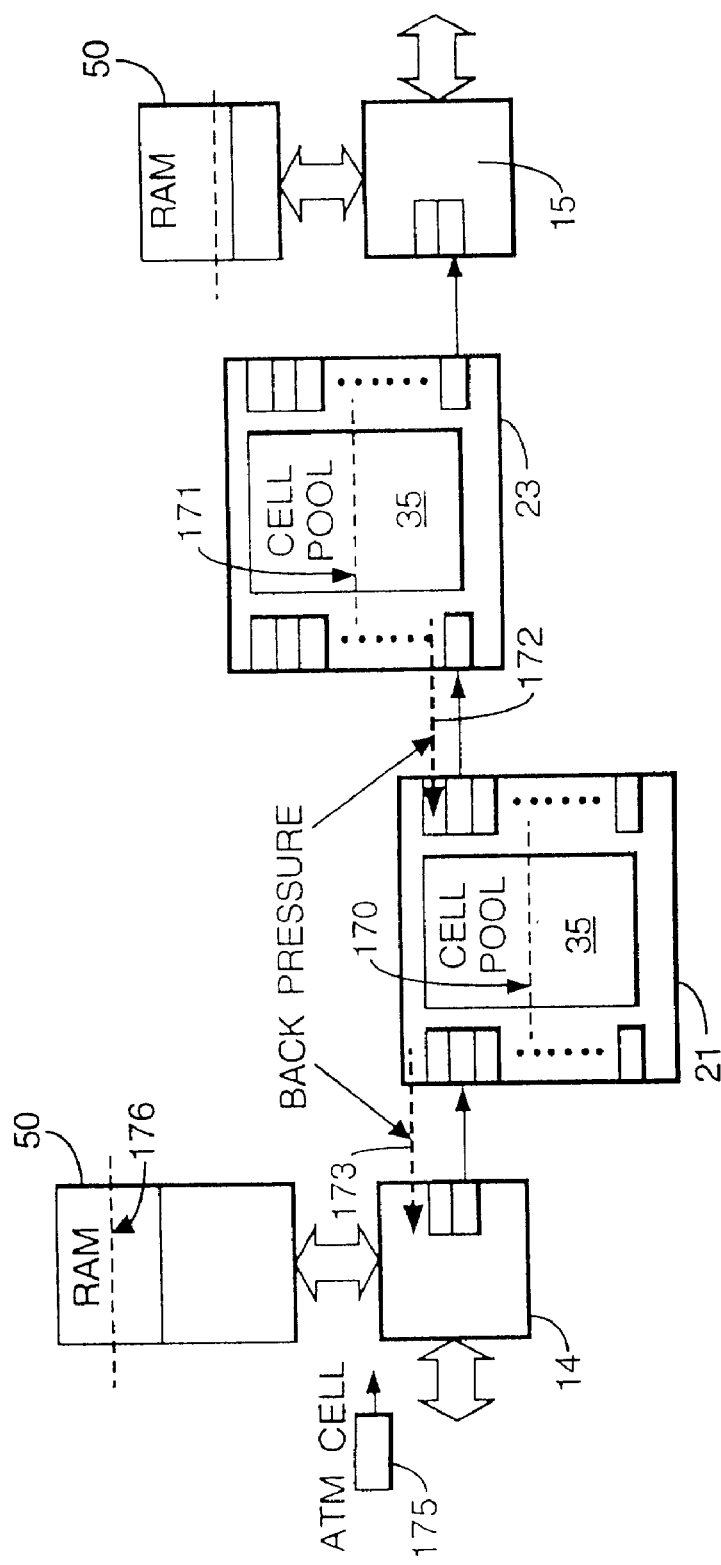
FIG. 16 illustrates schematically the arrangement of FIG. 2 when flow control tokens of FIG. 15 are operating.

When any counters establish that inhibition of ABR flow must commence, a flow control token to restrict flow is generated by the output circuitry of the switch and forms part of the trailer of the packet that is output from the switch. The format of the flow control token is illustrated in FIG. 15. The manner in which this acts in the switch network is illustrated schematically in FIG. 16. FIG. 16 corresponds to the arrangement shown in FIG. 3. In this case, switch 21 has a threshold level 170 set for a particular type of ABR traffic and that threshold has been reached by the relevant type of traffic stored in the pool 35. In the case illustrated switch 21 cannot output further traffic of that type to the next switch 23 in the sequence as switch 23 has also a buffer content for that same type of traffic which has reached the threshold level 171 set for switch 23. Consequently flow control tokens passing from switch 23 back to switch 21 along line 172 indicate back pressure to switch 21 to inhibit further flow of cells of that type from switch 21 to switch 23. As switch 21 is full of cells of that type, it also emits flow control tokens, thereby indicating back pressure, along line 173 to the input interface 14. This inhibits interface 14 from sending any further cells of that designated type to switch 21 until the back pressure 173 has been cleared. In the meantime, any further ATM cells 175 arriving at the interface 14 are stored in the RAM 50 associated with the interface 14. The RAM 50 may have a programmed threshold indicated at 176 but as illustrated the content of the RAM 50 does not exceed level 177 so that the RAM 50 may store these cells until the switch network is capable of taking further cells from the interface.

The bit format of the flow control token is shown in FIG. 15. The first bit 180 is marked Ti and is used only as a selector bit and will be described below. The next eighteen bits 181 are used to indicate port congestion for any one of the ports 1–18 based on the aggregate queue lengths for priority F6 for that port or the aggregate of queue lengths for priority F7 at that port. The selector bit 180 is used to indicate whether the set of bits 181 relate to priority F6 or priority F7. If Ti is set to the value 0 then the per port control indicated by bits 1–18 relate to the aggregate queue lengths of priority 6. If Ti is set to the value 1, then bits 1–18 indicate congestion at the respective ports for queue lengths of priority 7.

The next bit 182 shown in FIG. 15 is used to indicate congestion within the buffer partitions for multicast ABR cells having priority 6 or 7. Again the value set by the selector bit 180 determines whether bit 182 relates to congestion for priority F6 or F7. The counters 90 referred to in FIG. 10 include a counter for multicast ABR signals of priority F6 and F7 which are held in the buffer although no separate partition is illustrated in FIG. 14. A threshold value for these multicast counts will also be set in the threshold store 91. It will be appreciated that all the counters used for congestion and flow control are arranged to increment the count by 1 as the buffer inputs a new cell of the respective type and allocates it to a particular queue. The counter is decremented as a cell of that type is output from the switch.

The next bit 183 shown in FIG. 15 indicates whether congestion occurs for the number of ABR cells of priority 6 and 7 held in the partitions 162 or 164 of the buffer shown in FIG. 14. The last bit 184 is used to indicate whether congestion occurs for ABR cells of priority 0–5 held in the partitions 161 and 163 of the buffer shown in FIG. 14. In the case of each of bits 182, 183 and 184 it is necessary to distinguish between cells moving in the upward direction or the downward direction. In the case of the multicast ABR signals of priority 6 or 7, separate counts are held for appropriate cells in both the upward and downward directions. The values held in bit locations 182, 183 and 184 apply to cells in the up or down direction in dependence on the value held in register 94 of FIG. 10 identifying whether the congestion applies to cells in the up or down direction.

CBR Congestion Control

Figure 17:
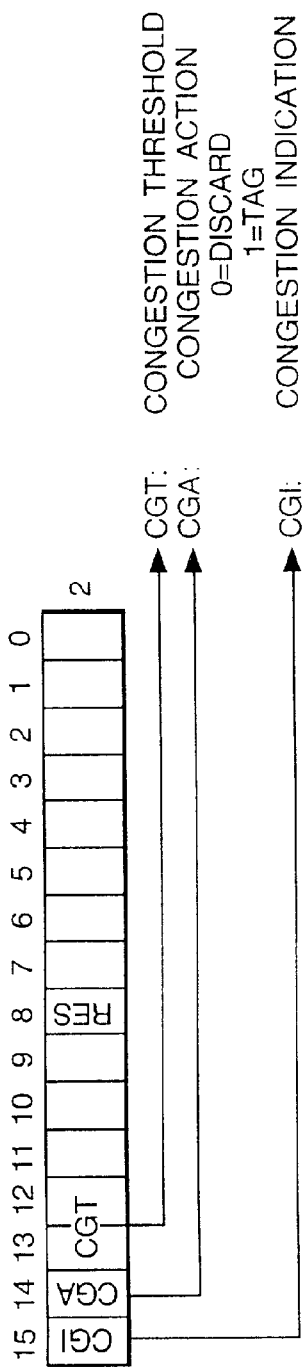
FIG. 17 shows a further part of the frame of FIG. 4 used to control congestion.
Figure 18:
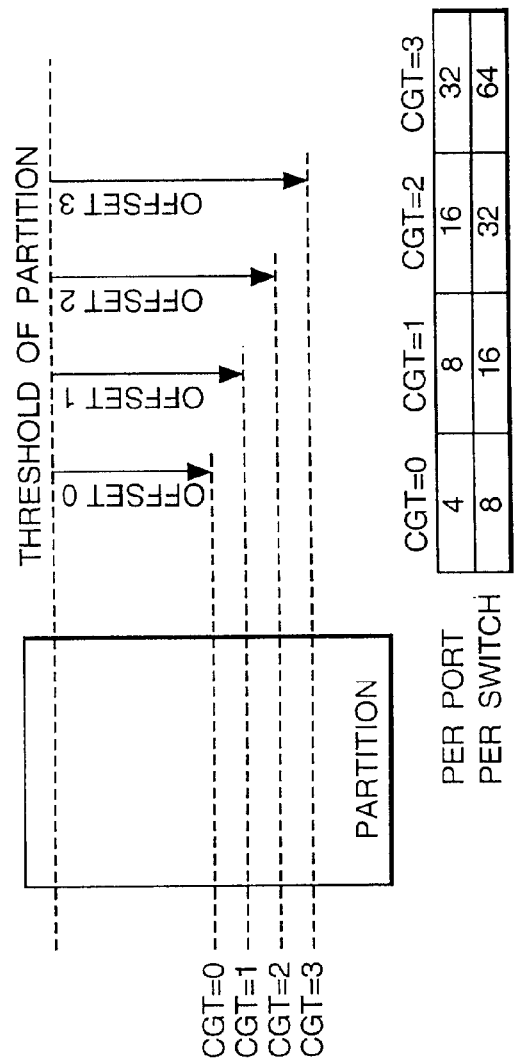
FIG. 18 shows further details of the operation of congestion control of FIG. 17, FIGS. 19(*a*)–19(*b*) are a schematic diagram showing more detail of the routing switch of FIG. 2

In the case of CBR traffic, any congestion detected in the buffer 35 or at any of the ports 30, will result in some congestion control determined by information in the header 60 of each packet. This will be explained with reference to FIG. 17 showing the relevant part of the header. In that Figure, bits 12 and 13 indicate a CGT value and the operation of this is explained with reference to FIG. 18. The CGT value indicates an offset value from the threshold values set for the buffer 35 or the ports 30. As illustrated in FIG. 18 the CGT value may be 0, 1, 2 or 3. If CGT=0 then the offset value per port is 4 and per switch buffer is 8. For CGT=1 the offset values are 8 per port and 16 per switch buffer. For CGT=2 the offset values are 16 per port or 32 per switch buffer. For CGT=3 the offset values are 32 per port or 64 per switch buffer. This indicates that if the per port count of CGT cells reaches the offset value from the threshold set, either for the count on a per port basis or for the count set within the buffer partition, then some form of congestion action is required. The type of action then taken depends on the value set by the CGA bit shown in FIG. 17. If CGA has the value 0 then the cell should be discarded. Further cells may arrive from adjacent switches or interfaces and each cell as it is input will be tested in the same way to see whether or not it should be accepted into the switch buffer or discarded. If however CGA=1 and the CGT value indicates that the offset from the threshold has now been reached, then the cell is accepted into the switch buffer for onward transmission but the CGI indicator at bit position 15 in FIG. 17 is set to the value 1. That bit then remains unchanged for the remainder of the transmission of the packet through the switch fabric so as to indicate that the path of that type of cell is nearly congested.

Switch Layout

Figure 19B:
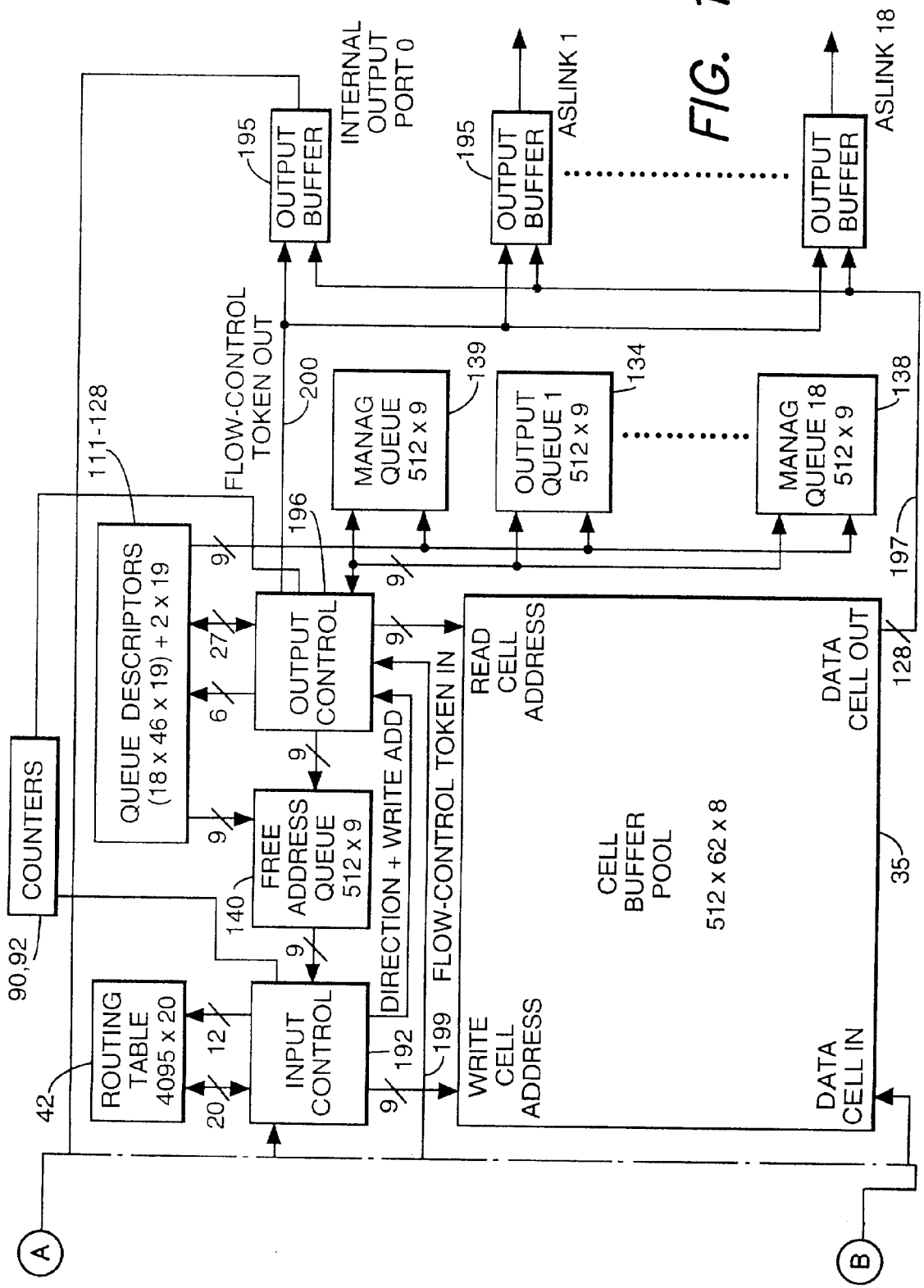

A more detailed block diagram of the switch layout is shown in FIGS. 19(a)–19(b). Similar parts have similar reference numerals to the earlier figures. In this case each of the ports 30 has been split to show the input operations at the left hand side of the figure and the output operations from the same ports at the right hand side of the figure. This comprises a plurality of input buffers 190 each having a capacity to hold an entire frame. The management circuitry 40 controls decoding of each frame held in an input buffer so that data from the frame header is supplied along line 191 to input control circuitry 192 to determine the write address in the cell buffer pool 35. That write address is determined from the free address queue 140. The date to be written in is supplied to the pool on line 193 from the data section 61 of each frame. The input control circuitry 192 has a two-way connection to the routing table 42 in the case of cells using implicit addressing. Output buffers 195 each having a capacity to hold a full frame are loaded with data under the control of output control circuitry 196. The output control circuitry 196 responds to the management queue 139 to provide read addresses to the buffer 35 and the data read out on line 197 is loaded into the appropriate output buffer 195. The output control 196 also receives on line 199 any flow control tokens which have been extracted from the input data received by the input buffers 190. In response to flow control tokens received on line 199, the output control circuitry 196 may inhibit the further output of selected types of cells from the output buffers 195. Both the input control circuitry 192 and output control circuitry 196 are connected to the counters 90 and 92 and if it is necessary to generate flow control tokens these may be output from the output control circuitry 196 on line 200 so as to be included in the trailers of frames which are output from the output buffers 195. The management circuitry 40 includes a port 201 for connection to the control CPU 25 and a test port 202.

Figure 20:
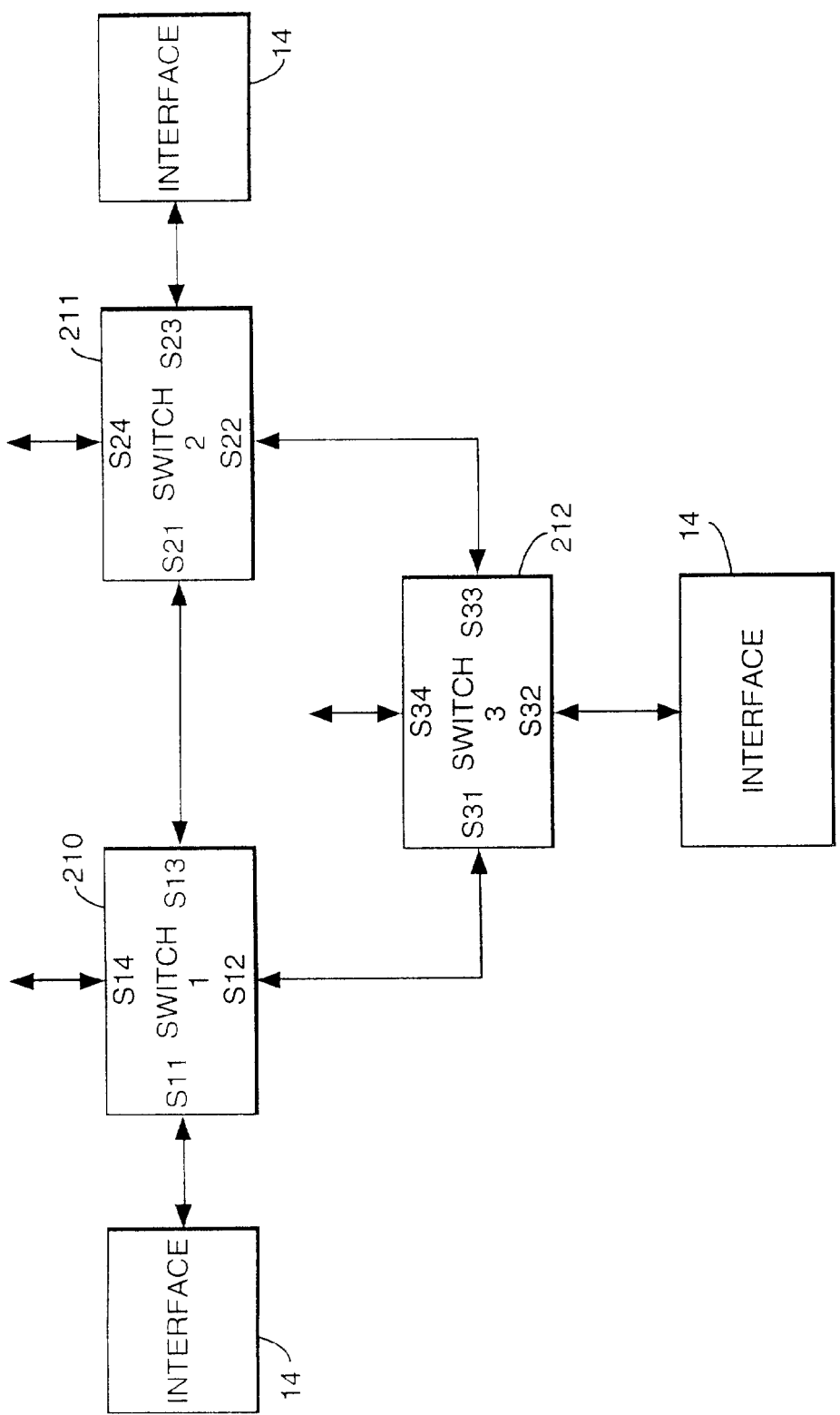
FIG. 20 shows a scheme of permitted connections in a network of switches in accordance with the invention.

The above example describing avoidance of deadlock relates to a linear chain having two opposite directions called up and down. However the invention is applicable to other networks of the type shown in FIG. 20 where a plurality of switches, each similar to those described in FIGS. 2 or 19(a)–19(b), are connected in a non-linear configuration. In the example shown in FIG. 20, three switches 210, 211 and 212 are connected between three similar interfaces each marked 14. Although each of the switches will have a plurality of ports, for simplicity only four are shown on each switch. For example on switch 210 the ports are marked S11, S12, S13 and S14. Each is a bi-directional port in that it can take input or give output signals through the port. To avoid deadlock it is necessary for each switch to include registers similar to register 94 in FIG. 10 in :order to designate each input port with a respective type or direction. Depending on the complexity of the network, a plurality (for example 2, 3 or more) of types or directions must be specified and each type or direction forms one part of an ordered sequence. This will be determined by the control CPU 25 in FIG. 1 and programmed into the corresponding register 94 of each switch. Once the ordered sequence for each designated type or direction of input port has been specified, each switch can only output cells in accordance with the order of the sequence. Each cell as it is input through a port is designated as a cell of the type corresponding to the designation of the input port through which the cell was input. The buffer is partitioned with separate categories corresponding to each type or direction designated for a port so that the buffer of FIG. 14 is modified to provide separate categories for each direction or type of input port that is designated. Each switch can then output a cell of a designated type only to an input port of an adjacent switch which does not run counter to the ordered sequence of types. Consider for example output port S13 of switch 210 in FIG. 20 outputting a cell to the input port S21 of switch 211. The output port S13 will ascertain the type or direction designated to the cell which it wishes output. It can only do so to a designated input port S21 of switch 211 if the input port S21 has a type or designation at the same position in the ordered sequence or is further advanced in the order sequence. The output of any cell having a specific type or designated direction, can be output to a receiving input which forms any part of the ordered sequence either at the same position in the sequence as the designation of the cell itself or to an input port having a designation further advanced along the sequence, but never retrogressive in respect of the designation of the output cell in the sequence. Each of the switches shown in FIG. 20 is arranged so that the connection between the output port and input port of each switch is constrained to output cells of a designated type or direction only to inputs of a designated type or direction which meet the above conditions.

Figure 21:
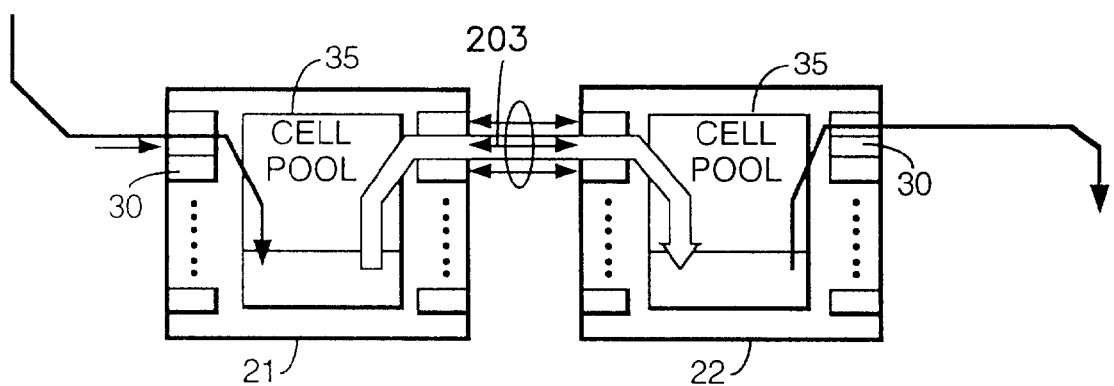
FIG. 21 shows an alternative interconnection between two routing switches of the type shown in FIG. 2.

The invention is not limited to the details of the foregoing example. For instance, any combination of switches may be interconnected in a network between appropriate input and output interfaces. The header information to determine routing through the switch network may be modified to provide necessary information for a different number of switches in the network. To provide a higher bandwidth connection between connected switches in the network consecutive links can be connected as shown in FIG. 20 to provide a high band-width bus connection between selected links on two adjacent switches. Such a grouped connection is illustrated at 202 between two switches 21 and 22 in FIG. 21.

What is claimed is:

1. A routing switch for bi-directional transmission of digital signal cells of at least two types, a first type requiring integrity of cell transmission while accepting variable bit rate of transmission, and a second type accepting some loss of cells in transmission, said switch comprising:

a plurality of input ports for receiving input cells for transmission through the switch;

a plurality of output ports for outputting output cells;

buffer circuitry selectively connectable to both said input and output ports for holding a plurality of cells of each type after receipt by an input port and prior to output by an output port;

designation circuitry to provide for each input port, and cells input through each port, a respective designation selected from at least first and second designations for use in determining permitted paths in a network;

said buffer circuitry providing a first reserved buffer capacity determined by a first threshold for cells of said first type having said first designation, a second reserved buffer capacity determined by a second threshold for cells of said first type having said second designation, a third reserved buffer capacity determined by a third threshold for cells of said second type; and control circuitry for determining whether each input cell is of said first or second type and whether cells of the first type are of the first or second designation, loading each input cell of said first type into said buffer and providing a flow control signal in a said output cell to inhibit further flow to the switch of cells of said first type of either of the first or second designations if said first and second thresholds for said first and second buffer capacities are reached for cells of the first type of the first and second designations respectively, and loading each input cell of said second type into said buffer if the number of cells of said second type in said buffer has not reached said third threshold for said third buffer capacity, or discarding input cells of said second type if said third threshold for said third buffer capacity has been reached.

2. A routing switch according to claim 1 in which said control circuitry includes threshold store circuitry to indicate first, second and third threshold values for respective numbers of cells of said first and second types in said buffer circuitry, and counting circuitry to count the number of cells of each of said type held in said buffer circuitry, whereby said control circuitry operates to provide flow control signals when a count of cells of said first type of either designation reaches the respective first or second threshold value and to discard cells of said second type when a count of cells of said second type reaches said predetermined threshold dependent on said third threshold value.

3. A routing switch according to claim 2 in which said buffer circuitry is partitioned to hold controlled numbers of cells for a plurality of categories of each of said first and second types, and said threshold store circuitry and counting circuitry each provide respective values for each of said categories.

4. A routing switch according to claim 3 in which said categories relate to respective different priorities for each of said first type of cell of the first designation, first type of cell of the second designation and second type of cell, and said threshold store circuitry and counting circuitry each provide respective values for each of said different priorities.

5. A routing switch according to claim 3 in which said buffer circuitry is partitioned to allocate some buffer capacity exclusively to each of said categories and some buffer capacity to be shared by more than one category.

6. A routing switch according to claim 1 in which the control circuitry includes a store to indicate for each input cell whether the designation is the first or second designation.

7. A routing switch according to claim 2 in which said buffer circuitry is partitioned to provide limited overflow capacity in excess of said first and second threshold values for cells of said first type to accomodate further cells of said first type which are output from a source of cells of said first type prior to input of flow control signals by said source to indicate that said first or second threshold has been reached.

8. A routing switch according to claim 1 in which said control circuitry includes input circuitry and output circuitry, said output circuitry being operable to form a plurality of queues of cells awaiting output at said output ports and to output each cell from a queue in a multi-bit frame including a digital signal cell and control bits, said input circuitry being operable to respond to said control bits to control the selection of each output port and queue.

9. A routing switch according to claim 8 in which said control bits are arranged to include a congestion indicator for each cell of said second type, said input circuitry being responsive to said congestion indicator to determine an offset value from a stored threshold for said second buffer capacity thereby indicating the said predetermined threshold at which a cell of said second type is discarded.

10. A routing switch according to claim 8 including counter means providing a count responsive to queue lengths at respective output ports, said control circuitry being operable in response to said count to initiate discard of cells of said second type.

11. A routing switch according to claim 8 including counter means providing a count responsive to queue lengths at respective output ports, said control circuitry being operable in response to said count to provide a flow control signal to limit input of cells of said first type.

12. A routing switch according to claim 1 wherein said buffer circuitry comprises at least a first switch and a second switch, said first and second switches coupled in series between said input and output ports.

13. A routing switch according to claim 12 wherein a data path is provided between said first and second switches for conveying cells therebetween.

14. A routing switch according to claim 13 wherein said flow control signal includes first flow control tokens passing from said second switch back to said first switch along a first flow control signal line intercoupling said first and second switches and for indicating a back pressure to said first switch to inhibit further flow of cells from said first switch to said second switch.

15. A routing switch according to claim 14 including an input interface, and second flow control tokens passing from said first switch back to said input interface along a second flow control signal line intercoupling said input interface and said first switch and for indicating a back pressure to said input interface to inhibit further flow of cells from said input interface to said first switch.

16. A routing switch according to claim 15 wherein said input interface has a memory associated therewith, and wherein any further ATM cells arriving at the input interface are stored in the memory.

17. A method for transmitting through a routing switch in a network, digital signal cells of at least two types, a first type requiring integrity of cell transmission while accepting variable bit rate of transmission, and a second type accepting some loss of cells in transmission, which method comprises:

receiving input cells at a plurality of input ports for transmission through the switch;

outputting output cells from a plurality of output ports;

holding in buffer circuitry a plurality cells of each type after receipt by an input port and prior to output by an output port;

designating each cell with a respective designation, selected from at least first and second designations, for use in determining permitted communication paths in the network;

providing in said buffer circuitry a first reserved buffer capacity determined by a first threshold for cells of said first type having said first designation, a second reserved buffer capacity determined by a second threshold for cells of said first type having said second designation, and a third reserved buffer capacity determined by a third threshold for cells of said second type;

determining whether each input cell is a first type in the first designation, a first type in the second designation, or second type;

loading each input cell of said first type into said buffer and providing a flow control signal in a said output cell to inhibit further flow to the switch of cells of said first type of either the first or second designation if a respective one of said first or second thresholds for said first or second buffer capacity is reached; and loading each input cell of said second type into said buffer if the number of cells of said second type in said buffer has not reached said third threshold for said third buffer capacity, or discarding input cells of said second type if said third threshold for said third buffer capacity has been reached.

18. A method according to claim 17 including providing first, second and third threshold values for respective numbers of cells of said first type of the first designation, first type of the second designation and second type, in said buffer circuitry, counting the number of cells of respective type and designation held in said buffer, providing flow control signals when a count of cells of said first type of either designation reaches said first or second threshold value and discarding cells of said second type when a count of cells of said second type reaches said third threshold value.

19. A method according to claim 17 in which each of said first, second and third reserved buffer capacities are subdivided to provide categories of different priority, a plurality of separate threshold values being provided for counts of each category.

20. A method according to claim 17 wherein cells held in said buffer form a plurality of queues at respective output ports, separate counts of queue length being maintained in addition to counts of numbers of cells held in the buffer, the generation of flow control signals and discarding of cells being responsive to both types of count.

21. A method according to claim 17 in which each digital signal cell forms part of a multi-bit frame including control bits, a flow control signal being formed in said control bits on output of a cell to indicate congestion in said switch for cells of said first type of either of the first or second designations.

22. A method according to claim 21 in which cells in said buffer form a plurality of queues awaiting output at said output ports, the output of cells from any one queue being inhibited if a flow control signal has been received from the destination of cells of that queue indicating congestion for cells of the same type as those forming that queue.

23. A method according to claim 18 in which said cells have respective designations selected from more than two alternative designations and said buffer circuitry provides reserved buffer capacities for cells of the first type for each of said designations.

* * * * *